US011893391B2

(12) United States Patent
Wang et al.

(10) Patent No.: US 11,893,391 B2
(45) Date of Patent: Feb. 6, 2024

(54) PROCESSING COMPUTING JOBS VIA AN ACCELERATION DEVICE

(71) Applicant: ALIBABA GROUP HOLDING LIMITED, Grand Cayman (KY)

(72) Inventors: Wente Wang, Hangzhou (CN); Jiejing Zhang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 130 days.

(21) Appl. No.: 17/438,388

(22) PCT Filed: Apr. 26, 2020

(86) PCT No.: PCT/CN2020/086995
§ 371 (c)(1),
(2) Date: Sep. 10, 2021

(87) PCT Pub. No.: WO2020/221161
PCT Pub. Date: Nov. 5, 2020

(65) Prior Publication Data
US 2022/0156086 A1 May 19, 2022

(30) Foreign Application Priority Data

Apr. 29, 2019 (CN) .......................... 201910357589.3

(51) Int. Cl.
*G06F 9/38* (2018.01)
*G06F 9/48* (2006.01)
(52) U.S. Cl.
CPC .......... *G06F 9/3877* (2013.01); *G06F 9/3836* (2013.01); *G06F 9/4881* (2013.01)
(58) Field of Classification Search
CPC .... G06F 9/3877; G06F 9/3836; G06F 9/4881; G06F 9/505; G06F 8/61; G06F 9/5055;
(Continued)

(56) References Cited

U.S. PATENT DOCUMENTS 9,323,455 B2 4/2016 Jeong et al.
9,428,127 B2 8/2016 Cooper et al.
(Continued)

FOREIGN PATENT DOCUMENTS

CN 104536813 A 4/2015
CN 105824706 A 8/2016
(Continued)

OTHER PUBLICATIONS

International Search Report to corresponding International Application No. PCT/CN2020/086995, dated Jul. 27, 2020 (2 pages).
(Continued)

*Primary Examiner* — Farley Abad
(74) *Attorney, Agent, or Firm* — James J. DeCarlo; Greenberg Traurig, LLP

(57) ABSTRACT

The example embodiments provide a method, a system, a mobile device, and an acceleration device for processing computing jobs. The method includes: obtaining, by a mobile device, a computing job, wherein a first interface of the mobile device is connected to a second interface, the second interface included in an acceleration device; transmitting, by the mobile device, the computing job from the first interface to the second interface via a write command; receiving, by the acceleration device, the computing job at the second interface; processing, by the acceleration device, the computing job and transmitting a processing result from the second interface to the first interface; and obtaining, by the mobile device, the processing result from the first interface via a read command. In the application, the dependency of processing the computing job on software and hardware resources of a mobile device is reduced, the issue in which processing the computing job depends on the quality of network transmission is resolved, and the objec-
(Continued)

tive of applying an acceleration device to a mobile device adopting a mobile OS is achieved.

20 Claims, 9 Drawing Sheets

(58) Field of Classification Search
CPC .. G06F 2209/509; G06F 9/5066; G06F 9/547; G06F 15/163
See application file for complete search history.

(56) References Cited

U.S. PATENT DOCUMENTS

| | | | |
|---|---|---|---|
| 9,489,616 B2 | 11/2016 | Sharma et al. | |
| 9,769,596 B2 | 9/2017 | Dow et al. | |
| 10,033,813 B2 | 7/2018 | Kripalani et al. | |
| 10,170,121 B2 | 1/2019 | Luddecke et al. | |
| 10,348,691 B2 | 7/2019 | Adhikari | |
| 11,023,935 B2 | 6/2021 | Cho et al. | |
| 2003/0188097 A1* | 10/2003 | Holland | G06F 11/1076 714/E11.034 |
| 2005/0075135 A1* | 4/2005 | Cromer | G06F 21/85 455/556.1 |
| 2009/0013092 A1* | 1/2009 | Pao | G06F 13/385 709/250 |
| 2009/0042608 A1 | 2/2009 | Moon et al. | |
| 2012/0124568 A1* | 5/2012 | Fallon | G06F 9/453 717/169 |
| 2012/0274656 A1* | 11/2012 | Kang | G06F 1/1632 345/619 |
| 2013/0080567 A1* | 3/2013 | Pope | G06Q 40/04 709/213 |
| 2013/0227694 A1* | 8/2013 | Weinstein | G06F 21/577 726/25 |
| 2014/0173674 A1* | 6/2014 | Wolman | H04N 21/6181 725/116 |
| 2014/0364711 A1 | 12/2014 | Ismail et al. | |
| 2015/0082178 A1 | 3/2015 | Summers et al. | |
| 2016/0036883 A1 | 2/2016 | Vitthaladevuni et al. | |
| 2016/0173387 A1* | 6/2016 | Chandrayana | H04L 67/56 370/231 |
| 2016/0253093 A1 | 9/2016 | Zhang | |
| 2016/0314008 A1* | 10/2016 | Han | G06T 1/20 |
| 2017/0295451 A1* | 10/2017 | Kim | H04W 4/60 |
| 2017/0324632 A1* | 11/2017 | Arora | H04L 43/04 |
| 2018/0150334 A1* | 5/2018 | Bernat | G06F 3/0608 |
| 2020/0142566 A1 | 5/2020 | Kang et al. | |
| 2021/0078571 A1 | 3/2021 | Zhu | |

FOREIGN PATENT DOCUMENTS

| | | |
|---|---|---|
| CN | 206541267 U | 10/2017 |
| EP | 3428808 A1 | 1/2019 |
| WO | 2016058560 A1 | 4/2016 |

OTHER PUBLICATIONS

Extended European Search Report to European Application No. 20798699.3 dated Dec. 21, 2022 (8 pages).

* cited by examiner

PROCESSING COMPUTING JOBS VIA AN ACCELERATION DEVICE

CROSS-REFERENCE TO RELATED APPLICATIONS

The application is a national stage of Int'l Appl. No. PCT/CN20/086995, which claims priority to Chinese Pat. Appl. No. 201910357589.3 filed on Apr. 29, 2019, both of which are incorporated herein by reference in their entirety.

BACKGROUND

Technical Field

The application relates to the field of computer technology, and in particular to a method, system, mobile device, and acceleration device for processing computing jobs.

Description of the Related Art

With the development of artificial intelligence (AI) technology and continuous improvements in the performance of mobile devices, mobile devices can perform a large number of computing jobs using processing rules, thereby expanding applications of AI technology.

Currently, two approaches are generally used by a mobile device to accelerate a computing job. In a first approach, a central processing unit (CPU) or a graphics processing unit (GPU) of the mobile device can be directly used to perform computing processing via the computing job. In a second approach, after receiving a computing job, the mobile device transmits the computing job to a cloud server via a network, and the cloud server performs the computing job and returns a result to the mobile device.

For a mobile device having a Linux® or Windows® operating system (OS), the first approach significantly consumes software and hardware resources of the mobile device and results in a hanging or "freezing" that occurs in the system of the mobile device and affects a user's experience. In the second approach, the processing the computing job depends on the quality of network transmission. Since the transmission process is relatively time-consuming, real-time computing processing cannot be achieved using the second approach.

SUMMARY

The example embodiments provide a method for processing computing jobs. In the example embodiments, the method reduces the dependence of processing the computing job on software and hardware resources of a mobile device, resolves issues in which processing the computing job depends on the quality of network transmission, and achieves the objective of applying an acceleration device to a mobile device running a mobile OS.

Correspondingly, the example embodiments further provide an apparatus, mobile device, and acceleration device for processing computing jobs to ensure the implementation and application of the above-mentioned methods.

To resolve the above-mentioned issues, disclosed in the example embodiments is a method for processing computing jobs. In an embodiment, the method comprises obtaining a computing job by a mobile device. In an embodiment, a first interface of the mobile device is connected to a second interface, the second interface included in an acceleration device. In an embodiment, the two interfaces communicating using a pre-configured interface protocol. The mobile device transmits the computing job to the second interface via the first interface by invoking a write command compliant with the pre-configured interface protocol via a management software development kit (SDK). The acceleration device receives the computing job via the second interface and processes the computing job. After processing, the acceleration device transmits a processing result to the first interface via the second interface. The mobile device then obtains the processing result from the first interface by invoking a read command compliant with the pre-configured interface protocol via the management SDK.

Disclosed in the example embodiments is a method for processing computing jobs executed by a mobile device, wherein a first interface of the mobile device is connected to a second interface, the second interface included in an acceleration device. In an embodiment, the first interface and the second interface communicate using a pre-configured interface protocol. In an embodiment, the method includes obtaining a computing job by a mobile device. The method can include transmitting the computing job from the first interface to the second interface by invoking a write command compliant with the pre-configured interface protocol via a management SDK. The method can then comprise obtaining the processing result from the first interface by invoking a read command compliant with the pre-configured interface protocol via the management SDK.

Disclosed in the example embodiments is a method for processing computing jobs executed by an acceleration device having a second interface connected to a first interface, the first interface associated with a mobile device. In one embodiment, the method can comprise receiving the computing job via the second interface. The method can then comprise processing the computing job and transmitting a processing result from the second interface to the first interface.

The example embodiments further disclose a system for processing computing jobs. In one embodiment, the system includes a mobile device and an acceleration device. In one embodiment, a first interface of the mobile device is connected to a second interface included in an acceleration device. In one embodiment, the first interface and the second interface communicate using a pre-configured interface protocol. In an embodiment, the mobile device can include a first obtaining module that obtains a computing job. The mobile device can further include a first invocation module for transmitting the computing job from the first interface to the second interface by invoking a write command compliant with the pre-configured interface protocol via a management SDK. The mobile device can further include a second invocation module for obtaining the processing result from the first interface by invoking a read command compliant with the pre-configured interface protocol via the management SDK. In an embodiment, the acceleration device can comprise a first receiving module for receiving the computing job at the second interface. In an embodiment, the acceleration device can further include a first processing module for processing the computing job and transmitting a processing result from the second interface to the first interface.

Further disclosed in the example embodiments is a mobile device. In an embodiment, the mobile device can include a first obtaining module for obtaining a computing job. In an embodiment, a first interface of the mobile device is connected to a second interface, the second interface included in an acceleration device. In an embodiment, the first interface and the second interface communicate using a pre-configured interface protocol. In an embodiment, the mobile device can include a first invocation module for transmitting the computing job from the first interface to the second interface by invoking a write command compliant with the pre-configured interface protocol via a management SDK. In an embodiment, the mobile device can include a second invocation module for obtaining the processing result from the first interface by invoking a read command compliant with the pre-configured interface protocol via the management SDK.

The example embodiments further disclose an acceleration device. In an embodiment, the acceleration device can comprise a first receiving module for receiving the computing job at the second interface. In an embodiment, the second interface of the acceleration device is connected to a first interface, the first interface included in a mobile device. In an embodiment, the acceleration device can comprise a first processing module for processing the computing job by the acceleration device and transmitting a processing result from the second interface to the first interface.

The example embodiments further disclose an electronic device. In an embodiment, the electronic device can comprise a processor and a memory. In an embodiment, the memory has executable code stored thereon. In an embodiment, when the electronic device executes the executable code, the executable code causes the processor to perform the method for processing computing jobs according to one or more of the example embodiments.

The example embodiments further disclose a non-transitory computer-readable storage medium. In an embodiment, the non-transitory computer-readable storage medium includes executable code stored thereon. In an embodiment, when a processor executes the executable code, the executable code causes a processor to perform the method for processing computing jobs according to one or more the example embodiments.

Compared with existing solutions, the example embodiments have at least the following advantages.

In the example embodiments, the mobile device transmits the computing job to the acceleration device, and the acceleration device independently performs computing processing on the computing job. As such, the mobile device does not participate in processing the computing job, thereby reducing the dependency of the computing job on software and hardware resources of the mobile device. Further, the example embodiments reduce the probability of hanging or freezing occurring by the OS of the mobile device. Additionally, a first physical interface and a second physical interface are used for data transmission between the mobile device and the acceleration device enabling real-time and fast transmission. This increased transmission speed resolves the issue in which the processing the computing job depends on the quality of network transmission. Finally, based on the architectural characteristics of the mobile OS, an application can adopt a read/write command library compliant with the current pre-configured interface protocol. Thus, the mobile device can use the write command in the read/write command library to trigger an operation in which the mobile device invokes a write interface of the OS to transmit data to the acceleration device. Similarly, the mobile device can use a read command included in the read/write command library to trigger an operation in which the mobile device invokes a read interface of the OS to receive a computing result transmitted by the acceleration device. Hence, the objective of applying an acceleration device to a mobile device adopting a mobile OS is achieved.

DETAILED DESCRIPTION

To further illustrate the above-mentioned objectives, features, and advantages of the disclosure, the disclosure is further described below in detail in combination with the accompanying figures and the specific implementation manners.

Figure 1:
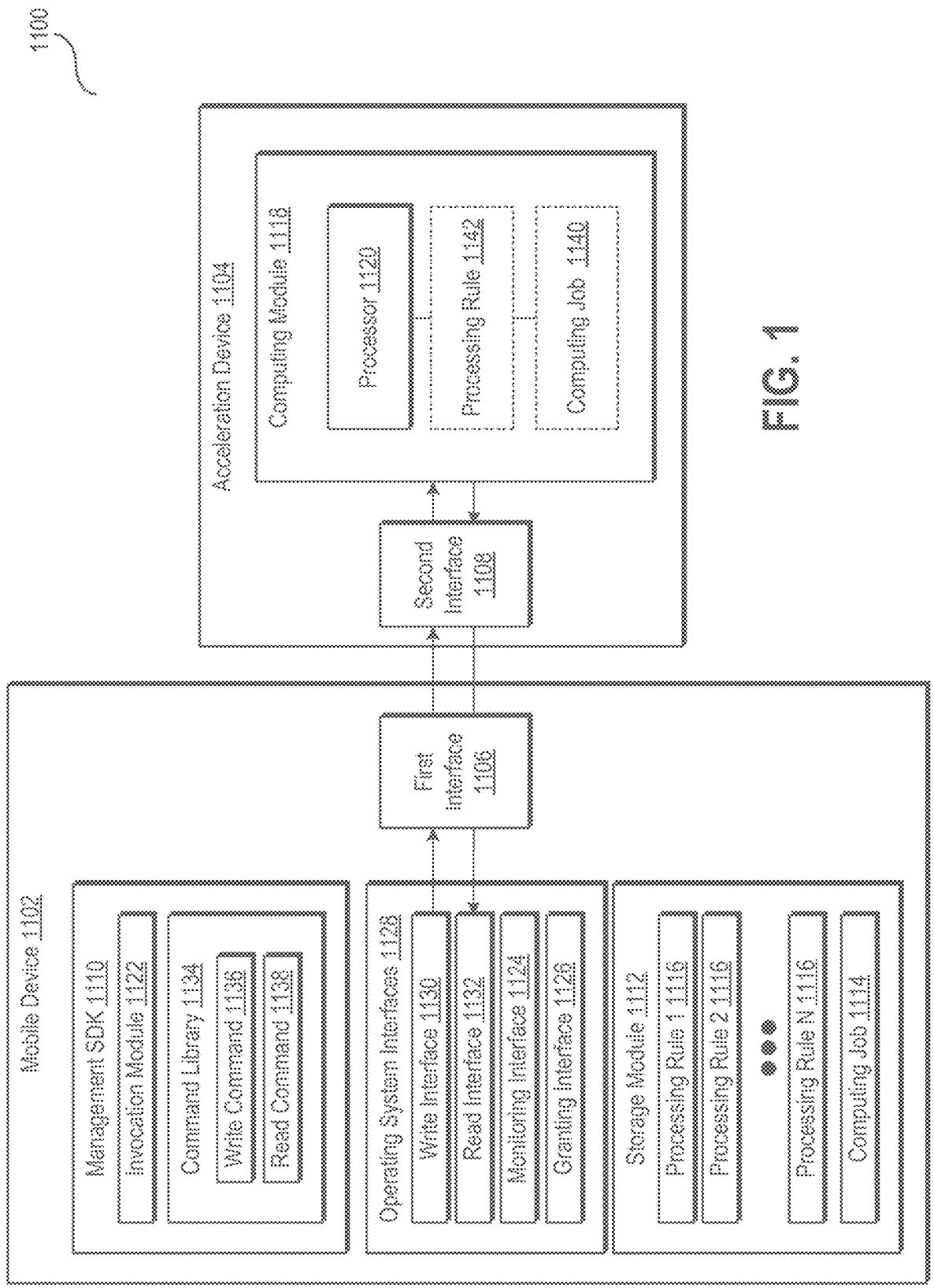
FIG. 1 is a block diagram of a system for processing computing jobs according to some embodiments.

Referring to FIG. 1, a block diagram of a system 1100 for processing computing jobs according to the example embodiments is illustrated. A method for processing computing jobs provided by the example embodiments can be applied to the system 1100 for processing computing jobs.

In the example embodiments, the system 1100 for processing computing jobs may include a mobile device 1102 and an acceleration device 1104. The mobile device 1102 includes a first interface 1106, and the acceleration device includes a second interface 1108.

Any mobile OS (e.g., Android, iOS, etc.) can be installed on the mobile device 1102, and various OS interfaces are provided so that operations such as data reading and writing, device monitoring, and permission granting can be implemented via these OS interfaces. The mobile device 1102 may further be provided with a management SDK 1110 used to manage the computing jobs and to achieve a communications connection based on the first interface 1106 and the second interface 1108 between the mobile device 1102 and the acceleration device 1104. In addition, the mobile device 1102 may further include a storage module 1112. The storage module 1112 can store an obtained computing job, and store processing rules 116 for processing the computing job 1114.

The mobile device 1102 may be a device such as a smartphone or a tablet on which any one of a mobile OS (e.g., Android, iOS, etc.) is installed.

The acceleration device 1104 may be a hardware device independent of the mobile device 1102, and the acceleration device 1104 may be physically connected to or communicatively connected to the first interface 1106 of the mobile device 1102 via the second interface 1108. The acceleration device 1104 is provided with a computing module 1118 for performing computing processing on computing job 1114. Specifically, the computing module 1118 includes a processor 1120. The processor 1120 may include one or more computing devices such as central processing unit (CPU) devices, graphics processing unit (GPU) devices, digital signal processing (DSP) chips, application-specific integrated circuit (ASIC) devices, co-processor chips, or field-programmable gate array (FPGA) chips. In the example embodiments, the acceleration device 1104 is used to perform offline computing processing on the computing job 1114 transmitted by the mobile device 1102, to achieve the effect of not occupying software and hardware resource of the mobile device 1102, thereby achieving great advantages in processing speed and result response.

The first interface 1106 and the second interface 1108 have a certain physical structure, and a physical connection between the mobile device 1102, and the acceleration device 1104 can be achieved. In addition, after a series of device handshake operations, a communications connection between the mobile device 1102 and the acceleration device 1104 is achieved. Specifically, the first interface 1106 and the second interface 1108 can adopt a pre-configured interface protocol, for example, a Universal Serial Bus (USB) interface protocol applied to a mobile device having an Android system or a Lightning interface protocol applied to a mobile device having an iOS system may be used. The interface protocol refers to a communication mode and communication requirements that need to be complied with between interfaces at which information exchange is to be performed. In the interface protocol, communication at a physical layer can be specified, and requirements for a syntax layer and a semantic layer need to be specified. In addition, by means of the matching of the physical structures of the first interface 1106 and the second interface 1108, a physical connection between the mobile device 1102 and the acceleration device 1104 is achieved.

Figure 2:
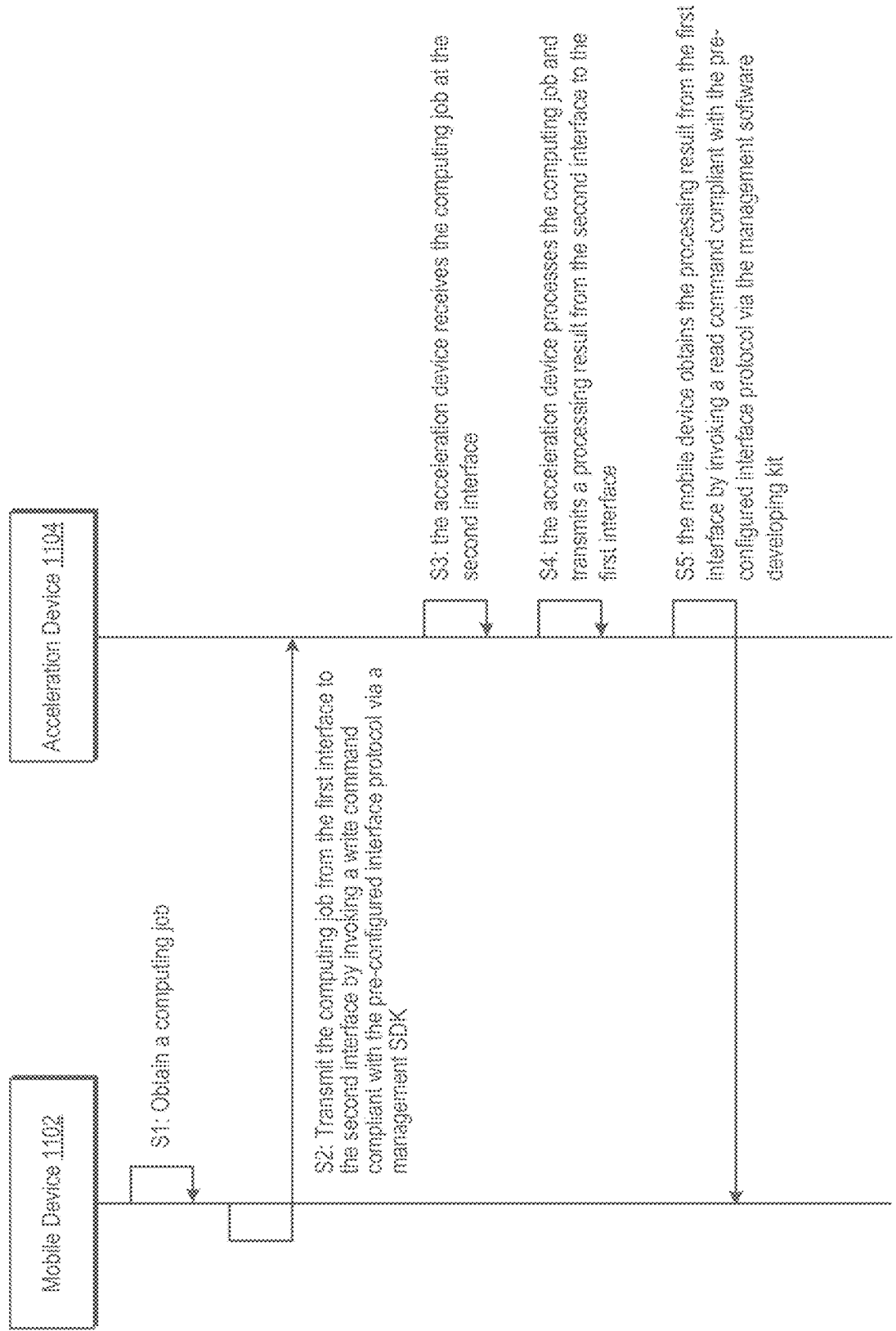
FIG. 2 is an interaction diagram of a system for processing computing jobs according to some embodiments.

Specifically, in the example embodiments, referring to FIG. 2, a block diagram of interactions in a system for processing computing jobs according to the example embodiments is illustrated. The mobile device 1102 can perform step S1, where the mobile device 1102 obtains a computing job.

Specifically, the computing job may include a configured amount of data to be processed. In addition, the computing job may be classified into a plurality of categories according to attribute information associated with the computing job, such as a graphics processing computing job, a text processing computing job, etc. Different types of computing jobs can be processed according to different types of processing rules. For example, the graphics processing computing job can be processed by preferably using processing rules such as a graphics classifier, a convolutional neural network model trained for image, etc., and the text processing computing job can be processed by preferably using processing rules such as a text classifier, a convolutional neural network model trained for text, etc.

Hence, in the example embodiments, a plurality of processing rules may be pre-configured in the mobile device. The mobile device can determine, according to a selection of a user, a computing job and a processing rule corresponding to the computing job. In addition, the mobile device 1102 can also determine the attribute information based on the obtained computing job itself and further automatically match the computing job with a corresponding processing rule based on the attribute information.

In the example embodiments, referring to FIG. 1, the mobile device 1102 can be provided with a management SDK 1110 in advance for the overall management of the computing jobs. In addition, the management SDK 1110 includes an invocation module 1122. The invocation module 1122 can invoke a monitoring interface 1124 and a granting interface 1126 in the OS interfaces 1128 of the mobile device 1102 so that after an acceleration device 1104 is monitored via the monitoring interface 1124, a grant from the user is further obtained via the granting interface 1126, thereby achieving a communications connection between the mobile device 1102 and the acceleration device 1104.

Specifically, in an embodiment, when the mobile device 1102 receives a computing job 1114 and the computing job 1114 further can be subjected to computing processing, the mobile device 1102 can be physically connected to the second interface 1108 of the acceleration device 1104 via the first interface 1106. After the physical connection is established, an operation in which the invocation module 1122 in the management SDK 1110 invokes the monitoring interface 1124 can be triggered so that the mobile device 1102 can start to monitor a connection status of an external device such as acceleration device 1104. When the mobile device 1102 receives device handshake data transmitted by the acceleration device 1104, an operation in which the invocation module 1122 in the management SDK 1110 invokes the granting interface 1126 is further triggered. In this case, granting notification information can be transmitted to the user via the mobile device 1102 so that the user performs a granting operation according to the granting notification information. After completion of the granting operation, the mobile device 1102 is communicatively connected to the acceleration device 1104, and further data interaction can be performed between the devices.

When the mobile device 1102 is communicatively connected to the second interface 1108 of the acceleration device 1104 via the first interface 1106, the mobile device 1102 can perform step S2 and transmit the computing job from the first interface to the second interface by invoking a write command compliant with the pre-configured interface protocol via the management SDK.

In the example embodiments, when the mobile device 1102 performs data interaction with the second interface 1108 of the acceleration device 1104 via the first interface 1106, writing and reading of the data depend on a write interface 1130 and a read interface 1132 of the OS of the mobile device 1102. In addition, the reading and writing of the data need to comply with the interface protocol corresponding to the first interface 1106 and the second interface 1108.

In the design of mobile operating systems, such as an Android or iOS, since the OS, the mobile device, and the interface protocol each are constantly and rapidly upgraded, an interface protocol corresponding to read and write operations is not strictly defined in the OS to avoid the need to modify, for each upgrade, the interface protocol defined in the OS.

For example, a mobile device having an Android OS can use a USB interface. USB is an external bus standard and is used to regulate connections and communications between mobile devices and external devices. In addition, the USB interface can implement a "hot plug" function between a mobile device and the acceleration device 1104, thereby facilitating use. However, with the continuous development of USB technology, the USB interface standards have been upgraded from the first generation, namely USB 1.1, to the current generation, namely USB 3.1. In addition, depending on the specific structure of the USB interface, different USB interface types (e.g., type-A, type-B, and type-C) are also available. If the architecture of Android OS and the interface protocol defined in Android OS are modified for each upgrade of the USB interface, then a heavy workload can be coped with.

Therefore, a solution for an Android OS implementation includes using an Android Debug Bridge (ADB) command library 1134 to achieve data interaction between the mobile device 1102 and the acceleration device 1104. That is, a command library 1134 compliant with the interface protocol of the current mobile device is adopted, and a write command and a read command included in the command library 1134 are used to trigger and invoke the operation of the write interface 1130 and the read interface 1128 of the OS. The ADB command library can be stored in the management SDK 1110 and can be specifically stored in a platform-tools folder in an installation directory of the management SDK 1110. Since the ADB command library 1134 is stored in the management SDK 1110, commands in the ADB command library 1134 can be modified easily so that in an upgrade of the USB interface, the workload for modifying the interface protocol is reduced.

However, since the interface protocol adopted by the mobile device based on the Linux/Windows OS is nearly fixed, few upgrades are made to the interface protocol. Therefore, a mobile device based on the Linux/Windows OS can implement data interaction between the mobile device based on the Linux/Windows OS and the external device by directly invoking the read/write interface in the OS.

In this step, when the mobile device 1102 is communicatively connected to the second interface 1108 of the acceleration device 1104 via the first interface 1106, a write command 1136 compliant with the pre-configured protocol can be invoked via the management SDK 1110 included in the mobile device 1102 so that the invocation module 1122 in the management SDK 1110 is called according to the write command 1136.

Further, the invocation module 1122 in the management SDK 1110 can invoke the write interface 1130 of the OS according to the write command 1138 to subsequently perform the operation of writing data to the acceleration device 1104. Specifically, the data may include a computing job 1114 and a processing rule corresponding to a computing job 1114. When the mobile device 1102 obtains a computing job 1114, the computing job 1114 can be stored in a storage partition of the storage module 1112 corresponding to the management SDK 1110 to facilitate management performed by the management SDK 1110 on the computing job 1114.

In addition, the processing rule is a rule regarding how to perform computing on the computing job 1114. For example, for images, a rule can define how to perform object recognition on an image. For a large amount of user data, a rule can define how to analyze user preferences. The processing rule may be a mathematical model. The mathematical model can comprise a scientific or engineering model constructed by using a mathematical logic method and mathematical language. The mathematical model can comprise a mathematical structure generally or approximately expressed in the mathematical language with reference to characteristics or a quantitative dependence relationship of a certain system. Such a mathematical structure can compise a pure relational structure of a certain system depicted by mathematical symbols. The mathematical model may be one or a group of algebraic equations, differential equations, difference equations, integral equations, or statistical equations and a combination thereof, and a mutual relationship or a causal relationship between variables of the system are described quantitatively or qualitatively by these equations. In addition to the mathematical model expressed in equations, mathematical tools further include models expressed in, for example, algebra, geometry, topology, mathematical logic, etc. The mathematical model describes the behavior and characteristics of the system rather than the actual structure of the system. A simulator uses a machine learning method, a deep learning method, etc., to perform model training. The machine learning methods may include linear regression, decision tree, random forest, xgboost, lightgbm, etc., and the deep learning methods may include Convolutional Neural Networks (CNN), Long Short-Term Memory (LSTM), Gated Recurrent Unit (GRU), etc.

In the example embodiments, the mobile device 1102 transmits the computing job 1114, and the associated processing rule to the acceleration device 1104, and the acceleration device 1104 independently performs processing so that the mobile device 1102 need not participate in computing processing the computing job 1114, thereby reducing the dependence of processing the computing job on software and hardware resources of the mobile device 1102.

The acceleration device 1104 can perform step S3 and receive the computing job via the second interface.

The acceleration device 1104 can then perform step S4: processing the computing job and transmitting a processing result from the second interface to the first interface.

In this step, after writing the received processing rule into a processor 1120 of the acceleration device 1104, the acceleration device 1104 can use the processor 1120 to process the computing job 1140 corresponding to the processing rule 1142 to obtain a computing result. The processor 1120 of the acceleration device 1104 is, for example, a CPU, a GPU, etc. The acceleration device 1104 can use a processor 1120 of a corresponding type to perform computing processing according to attributes of the computing job 1140 and the processing rule 1142. For example, the GPU is preferably used to process a graphics processing computing job, and the CPU is preferably used to process a text processing computing job.

When the mobile device 1102 is communicatively connected to the second interface 1108 of the acceleration device 1104 via the first interface 1106, if the acceleration device 1104 obtains the computing result, then the acceleration device 1104 can transmit a notification to the mobile device 1102 before transmitting the computing result to the mobile device 1102 to notify the mobile device 1102 to invoke the read interface 1132 of the OS and prepare to receive data.

The mobile device 1102 can then perform step S5: obtain the processing result from the first interface by invoking a read command compliant with the pre-configured interface protocol via the management SDK.

In this step, when the mobile device 1102 is communicatively connected to the second interface 1108 of the acceleration device 1104 via the first interface 1106, the mobile device 1102 can invoke the read command 1138 compliant with the pre-configured interface protocol according to the notification transmitted by the acceleration device 1104 and via the management SDK 1110 included in the mobile device 1102 so that the invocation module 1122 in the management SDK 1110 further invokes the read interface 1132 of the OS according to the read command 1138 to perform the operation of receiving the computing result transmitted by the acceleration device 1104.

Therefore, in the example embodiments, the mobile device 1102 transmits the computing job 1114 to the acceleration device 1104, and the acceleration device 1104 independently performs computing processing on the computing job 1140 so that the mobile device 1102 does not participate in computing processing the computing job 1140, thereby reducing processing dependency of the computing job on software and hardware resources of the mobile device 1102 and reducing the probability of freezing occurring in the OS of the mobile device 1102. In addition, a physical first interface 1106 and a physical second interface 1108 are adopted for data transmission between the mobile device 1102 and the acceleration device 1104, and the transmission process is real-time and fast, thereby resolving the issue in which processing the computing job 1114 depends on the quality of network transmission. Finally, based on the architectural characteristics of the mobile OS, the application adopts a read/write command library 1134 compliant with the current pre-configured interface protocol. In the illustrated embodiment, the write command 1136 included in the read/write command library is used to trigger an operation in which the mobile device 1102 invokes a write interface 1130 of the OS to transmit data to the acceleration device 1104, and the read command 1138 included in the read/write command library 1134 is used to trigger an operation in which the mobile device 1102 invokes a read interface 1132 of the OS to receive a computing result transmitted by the acceleration device 1104. Hence, the objective of applying an acceleration device 1104 to a mobile device 1102 adopting a mobile OS is achieved.

Figure 3:
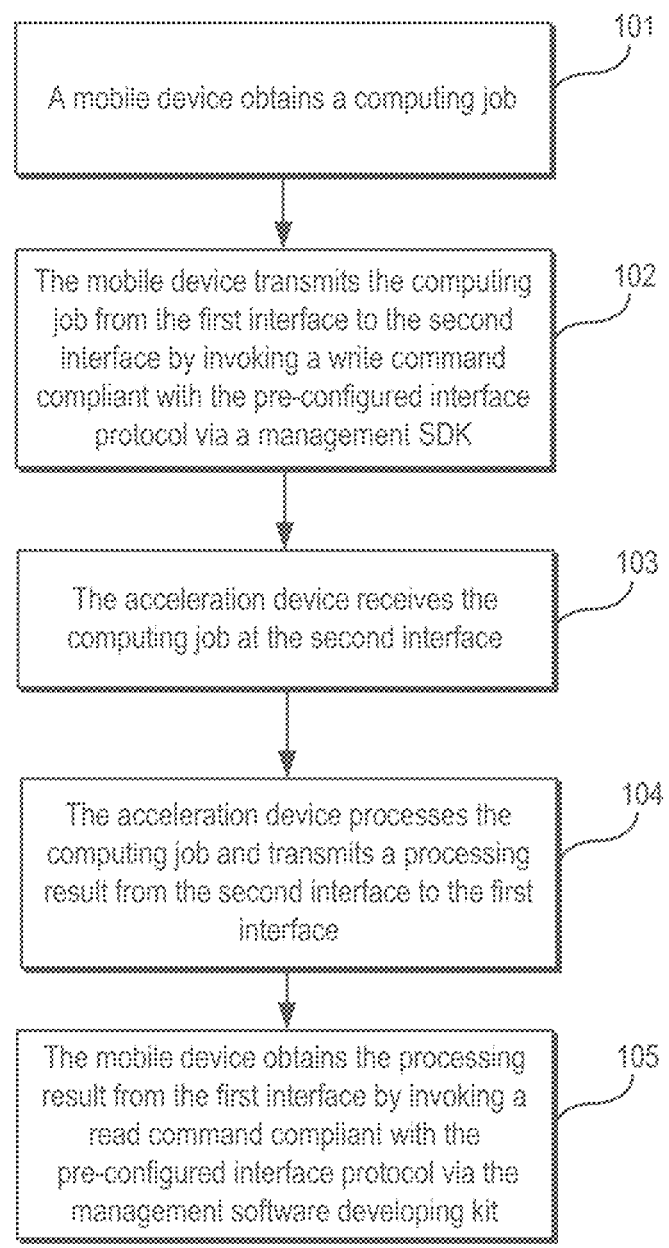
FIG. 3 is a flow diagram illustrating a method for processing computing jobs on a system side according to some embodiments.

FIG. 3 is a flow diagram illustrating a method for processing computing jobs on a system side according to some of the example embodiments.

In step 101, a mobile device obtains a computing job.

In an embodiment, a first interface of the mobile device is connected to a second interface, the second interface included in an acceleration device. In an embodiment, the first interface and the second interface communicate using a pre-configured interface protocol. Specifically, the computing job may include a certain amount of data to be processed. In addition, the computing jobs may be classified into a plurality of categories according to attribute information thereof, such as a graphics processing computing job, a text processing computing job, etc. Configuration of the computing job is not limited by the example embodiments.

Various methods can be adopted by the mobile device to obtain a computing job. For example, the computing job can be downloaded from a server, can be input by the user, or can be acquired by a sensor of the mobile device, wherein the sensor is, for example, a camera, an acceleration sensor, etc.

In step 102, the mobile device transmits the computing job from the first interface to the second interface by invoking a write command compliant with the pre-configured interface protocol via a management SDK.

In the example embodiments, referring to FIG. 1, the mobile device 1102 may be provided with a management SDK 1110 in advance for the overall management of computing jobs. In addition, the management SDK 1110 can include an invocation module 1122. The invocation module 1122 can invoke a monitoring interface 1124 and a granting interface 1126 in the OS interfaces 1128 of the mobile device 1102 so that after an acceleration device 1104 is monitored via the monitoring interface 1124, a grant from the user is further obtained via the granting interface 1126, thereby achieving a communications connection between the mobile device 1102 and the acceleration device 1104.

Specifically, since the OS, the mobile device, and the pre-configured interface protocol are constantly and rapidly upgraded, a mobile device can adopt a command library compliant with the current pre-configured interface protocol and use a write command and a read command included in the command library to trigger and invoke the operation of the write interface and the read interface of the OS to avoid the need to modify, for each upgrade, the interface protocol defined in the OS, thereby achieving the objective of generalizing data interaction between the mobile device and the external device.

The command library 1134 may be an Android Debug Bridge (ADB) command library. The ADB command library can be stored in the management SDK 1110 and can be specifically stored in a platform-tools folder in an installation directory of the management SDK 1110. Since the ADB command library is stored in the management SDK 1110, commands in the ADB command library can be modified easily so that in an upgrade of the USB interface, the workload for modifying the interface protocol is reduced. When the mobile device 1102 is communicatively connected to the second interface 1108 of the acceleration device 1104 via the first interface 1106, a write command 1136 compliant with the current pre-configured interface protocol can be invoked via the management SDK 1110 included in the mobile device 1102 so that the invocation module 1122 in the management SDK 1110 performs the operation of transmitting the computing job 1114 from the first interface 1106 to the second interface 1108 by further invoking the write interface 1130 of the OS according to the write command 1136.

In the example embodiments, the invocation module 1122 in the management SDK 1110 can invoke the write interface 1130 of the OS according to the write command 1136 to subsequently perform the operation of writing data to the acceleration device 1104. Specifically, the data may include a computing job 1114 and a processing rule corresponding to computing job 1114. When the mobile device 1102 obtains a computing job 1114, computing job 1114 can be stored in a storage partition of the storage module 1112 corresponding to the management SDK 1110 to facilitate management performed by the management SDK 1110 on the computing job 1114.

It should be noted that in the example embodiments, the mobile device 1102 can determine, according to a selection of the user, a computing job 1114 and a processing rule 1116 corresponding to the computing job 1114. In addition, the mobile device 1102 can also determine the attribute information of the computing job 1114 according to the obtained computing job 1114 and further automatically match the computing job 1114 with a corresponding processing rule 1116 based on the attribute information. The mobile device 1102 transmits the computing job 1114 and the processing rule 1116 to the acceleration device 1104, and the acceleration device 1104 independently performs processing so that the mobile device 1102 does not participate in the processing the computing job, thereby reducing a dependency in processing the computing job on software and hardware resources of the mobile device 1102.

In step 103, the acceleration device receives the computing job at the second interface.

In step 104, the acceleration device processes the computing job and transmits a processing result from the second interface to the first interface.

In these steps, after writing the received processing rule 1142 into a processor 1120 of the acceleration device 1104, the acceleration device 1104 can use the processor 1120 to process the computing job 1140 corresponding to the processing rule 1142 to obtain a computing result. The processor 1120 of the acceleration device 1104 is, for example, a CPU, a GPU, etc. The acceleration device 1104 can use a processor 1120 of a corresponding type to perform computing processing according to attributes of the computing job 1140 and the processing rule 1142. For example, the GPU is preferably used to process a graphics processing computing job, and the CPU is preferably used to process a text processing computing job.

Specifically, when the mobile device 1102 is communicatively connected to the second interface 1108 of the acceleration device 1104 via the first interface 1106, if the acceleration device 1104 obtains the computing result, then the acceleration device 1104 can transmit a notification to the mobile device 1102 before transmitting the computing result to the mobile device 1102 to notify the mobile device 1102 to invoke the read interface 1132 of the OS and prepare to receive data.

In step 105, the mobile device obtains the processing result from the first interface by invoking a read command compliant with the pre-configured interface protocol via the management SDK.

In this step, when the mobile device 1102 is communicatively connected to the second interface 1108 of the acceleration device 1104 via the first interface 1106, the mobile device 1102 can invoke the read command 1138 compliant with the pre-configured interface protocol according to the notification transmitted by the acceleration device 1104 and via the management SDK 1110 included in the mobile device 1102 so that the invocation module 1122 in the management SDK 1110 further invokes the read interface 1132 of the OS according to the read command 1138 to perform the operation of receiving the computing result transmitted by the acceleration device 1104.

In summary, a method for processing computing jobs provided by the application includes obtaining, by a mobile device, a computing job, wherein a first interface of the mobile device is connected to a second interface, the second interface included in an acceleration device. In an embodiment, the first interface and the second interface communicate using a pre-configured interface protocol; transmitting, by the mobile device, the computing job from the first interface to the second interface by invoking a write command compliant with the pre-configured interface protocol via a management SDK; receiving, by the acceleration device, the computing job at the second interface; processing, by the acceleration device, the computing job and transmitting a processing result from the second interface to the first interface; and obtaining, by the mobile device, the processing result from the first interface by invoking a read command compliant with the pre-configured interface protocol via the management SDK. The mobile device transmits the computing job to the acceleration device, and the acceleration device independently performs computing processing on the computing job so that the mobile device does not participate in computing processing the computing job, thereby reducing the dependency of processing the computing job on software and hardware resources of the mobile device and reducing the probability of freezing occurring in the OS of the mobile device. In addition, a physical first interface and a physical second interface are adopted for data transmission between the mobile device and the acceleration device, and the transmission process is real-time and fast, thereby resolving the issue in which processing the computing job depends on the quality of network transmission. Finally, based on architectural characteristics of the mobile OS, the application adopts a read/write command library compliant with the current pre-configured interface protocol; the write command comprised in the read/write command library is used to trigger an operation in which the mobile device invokes a write interface of the OS to transmit data to the acceleration device, and the read command comprised in the read/write command library is used to trigger an operation in which the mobile device invokes a read interface of the OS to receive a computing result transmitted by the acceleration device. Hence, the objective of applying an acceleration device to a mobile device adopting a mobile OS is achieved.

Figure 4:
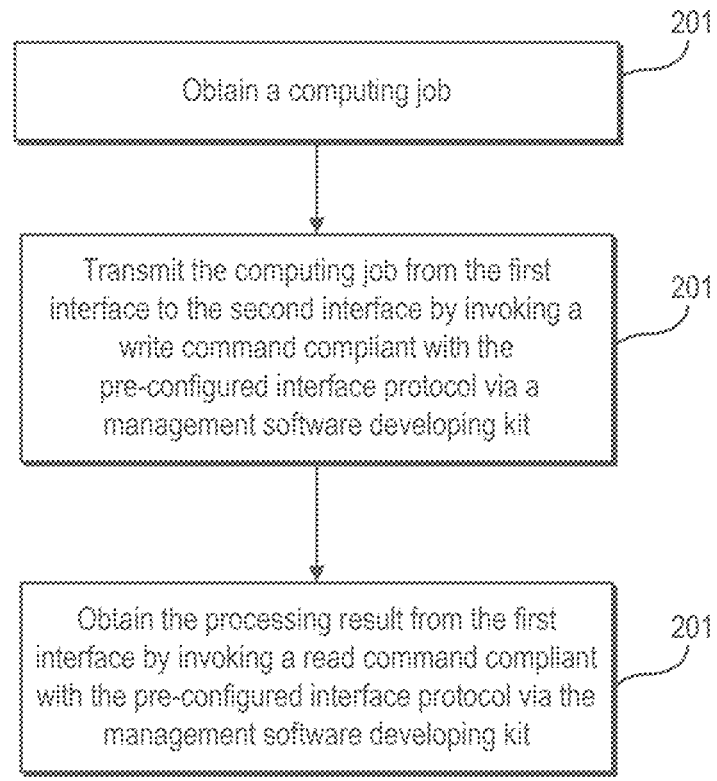
FIG. 4 is a flow diagram illustrating a method for processing computing jobs on a mobile device side according to some embodiments.

FIG. 4 is a flow diagram illustrating a method for processing computing jobs on a mobile device side according to some of the example embodiments.

In step 201, a computing job is obtained. For details of this step, please refer to the description of step 101, which is not be described herein again.

In step 202, the computing job is transmitted from the first interface to the second interface by invoking a write command compliant with the pre-configured interface protocol via a management SDK. For details of this step, please refer to the description of step 102, which is not be described herein again.

In step 203, the processing result is obtained from the first interface by invoking a read command compliant with the pre-configured interface protocol via the management SDK. For details of this step, please refer to the description of step 105, which is not be described herein again.

Figure 6:
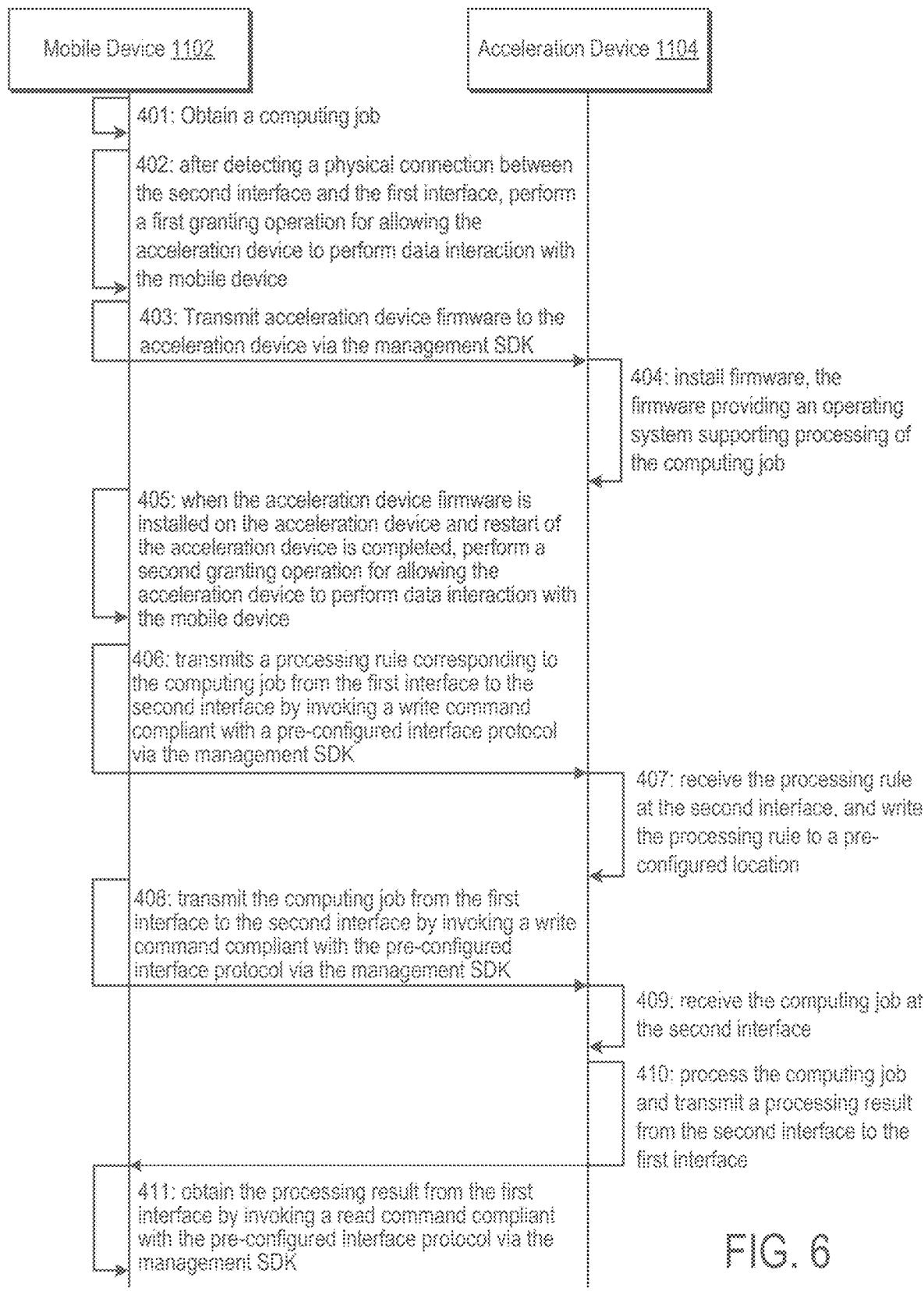
FIG. 6 is a flow diagram illustrating a method for processing computing jobs according to some embodiments.

It should be noted that reference can be made to the description for the interaction process between the mobile device 1102 and the acceleration device 1104 in FIG. 1 and FIG. 6 for specific execution steps on the mobile device side, which is not described herein again.

In summary, a method for processing computing jobs provided by the application includes: obtaining a computing job, wherein a first interface of the mobile device is connected to a second interface, the second interface included in an acceleration device. In an embodiment, the first interface and the second interface communicate using a pre-configured interface protocol; The method further comprises transmitting the computing job from the first interface to the second interface by invoking a write command compliant with the pre-configured interface protocol via a management SDK. The method further comprises obtaining the processing result from the first interface by invoking a read command compliant with the pre-configured interface protocol via the management SDK. In the example embodiments, the mobile device transmits the computing job to the acceleration device, and the acceleration device independently performs computing processing on the computing job so that the mobile device does not participate in computing processing the computing job, thereby reducing the dependency of processing the computing job on software and hardware resources of the mobile device and reducing the probability of freezing occurring in the OS of the mobile device. In addition, a physical first interface and a physical second interface are adopted for data transmission between the mobile device and the acceleration device, and the transmission process is real-time and fast, thereby resolving the issue in which processing the computing job depends on the quality of network transmission. Finally, based on architectural characteristics of the mobile OS, the application adopts a read/write command library compliant with the current pre-configured interface protocol; the write command comprised in the read/write command library is used to trigger an operation in which the mobile device invokes a write interface of the OS to transmit data to the acceleration device, and the read command comprised in the read/write command library is used to trigger an operation in which the mobile device invokes a read interface of the OS to receive a computing result transmitted by the acceleration device. Hence, the objective of applying an acceleration device to a mobile device adopting a mobile OS is achieved.

Figure 5:
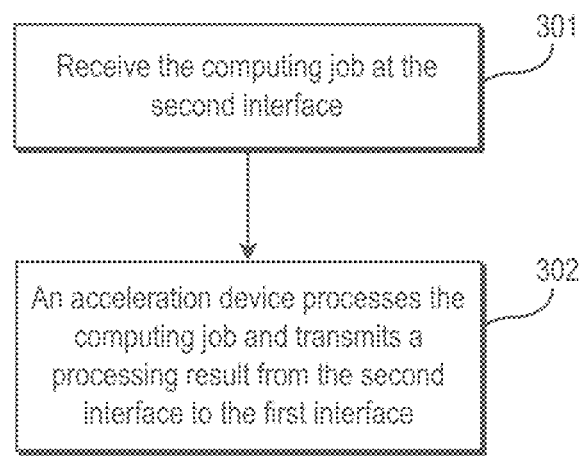
FIG. 5 is a flow diagram illustrating a method for processing computing jobs on an acceleration device side according to some embodiments.

FIG. 5 is a flow diagram illustrating a method for processing computing jobs on an acceleration device side according to some of the example embodiments.

In step 301, the computing job is received at the second interface. For details of this step, please refer to the description of step 103, which is not described herein again.

In step 302, an acceleration device processes the computing job and transmits a processing result from the second interface to the first interface. For details of this step, please refer to the description of step 104, which is not described herein again.

It should be noted that reference can be made to the description for the interaction process between the mobile device 1102 and the acceleration device 1104 in FIG. 1 and FIG. 6 for specific execution steps on the acceleration device side, which are not be described herein again.

In summary, a method for processing computing jobs provided by the application includes receiving the computing job at the second interface and processing, by the acceleration device, the computing job and transmitting a processing result from the second interface to the first interface. In the example embodiments, the mobile device transmits the computing job to the acceleration device, and the acceleration device independently performs computing processing on the computing job so that the mobile device does not participate in computing processing the computing job, thereby reducing the dependency of processing the computing job on software and hardware resources of the mobile device and reducing the probability of freezing occurring in the OS of the mobile device. In addition, a physical first interface and a physical second interface are adopted for data transmission between the mobile device and the acceleration device, and the transmission process is real-time and fast, thereby resolving the issue in which processing the computing job depends on the quality of network transmission. Finally, based on architectural characteristics of the mobile OS, the application adopts a read/write command library compliant with the current pre-configured interface protocol; the write command comprised in the read/write command library is used to trigger an operation in which the mobile device invokes a write interface of the OS to transmit data to the acceleration device, and the read command comprised in the read/write command library is used to trigger an operation in which the mobile device invokes a read interface of the OS to receive a computing result transmitted by the acceleration device. Hence, the objective of applying an acceleration device to a mobile device adopting a mobile OS is achieved.

FIG. 6 is a flow diagram illustrating a method for processing computing jobs according to some of the example embodiments.

In step 401, a mobile device 1102 obtains a computing job. For details of this step, please refer to the description of step 101, which is not repeated herein.

In step 402, after the mobile device 1102 detects a physical connection between the second interface and the first interface, a first granting operation for allowing the acceleration device 1104 to perform data interaction with the mobile device 1102 is performed.

In the example embodiments, to ensure privacy security during data interaction between the mobile device 1102 and the acceleration device 1104, the first granting operation for the acceleration device 1104 can be performed first. Specifically, when the acceleration device 1104 and the mobile device 1102 are communicatively connected to each other, the acceleration device 1104 transmits device information thereof to the mobile device 1102. The device information includes attributes and identity information of the acceleration device 1104, and the user can view the device information on the mobile device 1102. When determining that the device information is correct, the user can perform the first granting operation for the acceleration device 1104. The first granting operation may include that a notification bar pops up on the mobile device 1102 to ask the user whether to grant the currently connected acceleration device 1104 and that the first granting operation is completed after the user clicks on a granting confirmation button.

Figure 7:
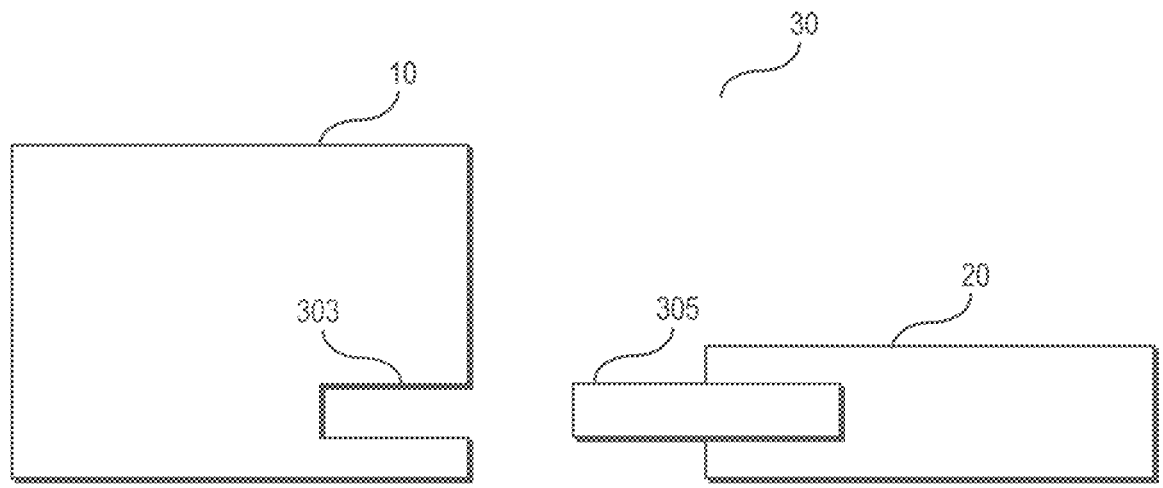
FIG. 7 is a block diagram of a mobile device and an acceleration device according to some embodiments.

Optionally, referring to FIG. 7, a block diagram of a mobile device and an acceleration device according to some of the example embodiments is illustrated. An input/output interface 30 includes a first interface 303 provided on the mobile device 10 and a second interface 305 provided on the acceleration device 20 and matching the first interface 303. Optionally, the input/output interface 30 includes either a USB interface and a Lightning interface.

In the example embodiments, the first interface 303 and the second interface 305 have a certain physical structure, and a physical connection between the mobile device 10 and the acceleration device 20 can be achieved. In addition, after a series of device handshake operations, a communications connection between the mobile device 10 and the acceleration device 20 is achieved. Specifically, the input/output interface 30 may include a USB interface applied to a mobile device having an Android system or a lightning interface applied to a mobile device having an iOS system. In addition, the first interface 303 may be a recessed structure, and the second interface may be a protruding structure corresponding to the recessed structure. The physical structure of the first interface 303 matches the physical structure of the second interface 305, and therefore a physical connection between the mobile device 10 and the acceleration device 20 is achieved.

In some embodiments, the first interface 303 may also be provided on the acceleration device 20, and the second interface 305 may also be provided on the mobile device 10, which is not limited by the application.

In step 403, the mobile device transmits acceleration device firmware to the acceleration device via the management SDK.

In some embodiments, firmware is a program written into an Erasable and Programmable Read-Only Memory (EPROM) or an Electrically Erasable and Programmable Read-Only Memory (EEPROM), and the firmware may also be referred to as a device "driver" stored in the device. In some embodiments, by providing the firmware, the OS of the mobile device can achieve operation of the acceleration device according to a standard device driver.

Therefore, to enable the acceleration device to operate normally, firstly, the mobile device can obtain acceleration device firmware according to the first granting operation. The acceleration device firmware can be downloaded from the Internet, or can also be obtained by the mobile device by another data copy method, or can also be pre-configured in a file of the SDK. The acceleration device firmware is used to provide an OS supporting processing the computing job.

After obtaining the acceleration device firmware of the acceleration device, the mobile device can transmit the acceleration device firmware to the acceleration device via the management SDK.

Optionally, step 403 can include substep 4031, which can comprise transmitting, by the mobile device according to the attribute information of the computing job, acceleration device firmware compliant with the attribute information to the acceleration device via the management SDK.

In some embodiments, to optimize an accelerated computing function of the acceleration device, corresponding acceleration device firmware can be provided for the acceleration device according to computing jobs that the acceleration device often performs computing processing on and attribute information of an adopted processing rule, and the user can select and transmit corresponding acceleration device firmware from the mobile device according to computing requirements thereof to the acceleration device to be installed thereon. In addition, after the acceleration device firmware is installed on the acceleration device, the acceleration device can use the acceleration device firmware for processing the computing job, or can replace the original acceleration device firmware with new acceleration device firmware, which is not limited by the application.

For example, in the acceleration device, regarding the graphics processing computing job and the text processing computing job, the GPU can be used to process the graphics processing computing job, and the CPU can be used to process the text processing computing job. Therefore, when the acceleration device processes the graphics processing computing job to optimize a system environment in which the GPU is located, acceleration device firmware compliant with the GPU can be adopted. When the acceleration device is to process the text processing computing job, to optimize a system environment in which the CPU is located, acceleration device firmware compliant with the CPU can be adopted. The user can select acceleration device firmware of a specific type according to the requirements thereof.

In step 404, the acceleration device firmware is installed on the acceleration device, and the acceleration device firmware is used to provide an OS supporting processing the computing job.

In this step, if no acceleration device firmware is installed on the acceleration device, then acceleration device firmware received by the acceleration device can be installed thereon. If acceleration device firmware has been installed on the acceleration device, then the acceleration device can replace the original acceleration device firmware with the received new acceleration device firmware.

In step 405, when the acceleration device firmware is installed on the acceleration device and restart of the acceleration device is completed, a second granting operation for allowing the acceleration device to perform data interaction with the mobile device is performed.

In some embodiments, after receiving the acceleration device firmware, the acceleration device may store an image of the firmware in Flash memory in the form of a file, and the same is loaded into a memory in the acceleration device when driver initialization is performed on (performed during restart) the acceleration device. In this case, an upgrade of the firmware is facilitated.

In the process of installing the new acceleration device firmware on the acceleration device, a restart operation can be performed on the acceleration device. During the process in which the acceleration device is powered off and restarted. In response, the acceleration device finds and loads new acceleration device firmware and causes the new acceleration device firmware to be installed thereon.

When the acceleration device firmware is installed on the acceleration device, and restart of the acceleration device is completed, the acceleration device may transmit to the mobile device a notification indicating that firmware installation is successful, informing the mobile device that installation of the acceleration device firmware is completed. After receiving the notification indicating that firmware installation is successful, the mobile device may perform further granting confirmations.

Therefore, when the acceleration device firmware is installed on the acceleration device and the restart of the acceleration device is completed, if data interaction between the mobile device and the acceleration device is to be further performed, further granting confirmation is needed. That is, the user needs to perform a second granting operation for the acceleration device. The second granting operation may include that a notification bar that pops up on the mobile device to ask the user whether to grant the currently connected acceleration device and that the second granting operation is completed after the user clicks on a granting confirmation button.

It should be noted that in some embodiments, the firmware can be pre-installed on the acceleration device, and the computing job transmitted to the acceleration device is specified as a computing job that the firmware can support processing performed thereon. In this case, steps 403, 404, and 405 can be omitted.

Optionally, in step 402 and step 405, the step of performing a first granting operation or a second granting operation for allowing the acceleration device to perform data interaction with the mobile device may include substeps A1 and A2. In substep A1, the mobile device invoking a device monitoring interface of the OS of the mobile device via the management SDK.

In the example embodiments, connections between the acceleration device and the mobile device include a physical connection and a communications connection. Referring to FIG. 7, the physical structure of the first interface 303 matches the physical structure of the second interface 305, and therefore a physical connection between the mobile device 10 and the acceleration device 20 is achieved. In addition, after the physical connection between the mobile device and the acceleration device is established, a series of device handshake operations can be performed between the mobile device and the acceleration device to ensure that the mobile device and the acceleration device are communicatively connected to each other. After the mobile device and the acceleration device are communicatively connected to each other, data interaction can be performed between the mobile device and the acceleration device.

Specifically, the physical structure of the first interface matches the physical structure of the second interface, and therefore a physical connection between the mobile device and the acceleration device is achieved. Then, the mobile device can determine, upon detecting an electrical signal on the first interface, that the physical connection is established and trigger the management SDK to invoke the device monitoring interface of the OS of the mobile device.

In addition, in the example embodiments, device restart operation can be performed on the acceleration device during the process of installing the acceleration device firmware on the acceleration device. During a restart of the device, the acceleration device undergoes a power-off operation. In this case, the mobile device disconnects the communications connection to the acceleration device. After the acceleration device firmware is installed on the acceleration device and the acceleration device is restarted, the mobile device can detect the physical connection to the acceleration device based on the pin status of the interface. Because the acceleration device does not disconnect the physical connection to the mobile device during the restart of the device, a status of a pin of the mobile device contacting the acceleration device does not change. The mobile device invokes the device monitoring interface of the OS of the mobile device via the management SDK to perform monitoring operation on the external device of the mobile device again.

In substep A2, when the mobile device obtains a peripheral component interconnect standard identifier of the acceleration device via the device monitoring interface, the acceleration device is granted authority for allowing the acceleration device to perform data interaction with the mobile device.

In the example embodiments, the device monitoring interface in the OS interfaces of the mobile device can monitor the connection status of the external device of the mobile device in real-time or near real-time. Specifically, after the physical connection between the mobile device and the acceleration device is established, the acceleration device transmits a Peripheral Component Interconnect (PCI) identifier thereof to the mobile device, the PCI being a standard for defining a local bus. After the physical connection between the mobile device and the acceleration device is established, the acceleration device can serve as a PCI device of the mobile device. For identification of the identity of the acceleration device, a corresponding PCI identifier can be generated for the acceleration device, and the acceleration device can transmit the PCI identifier to the mobile device. After receiving the PCI identifier of the acceleration device, the mobile device grants the acceleration device an authority for allowing the acceleration device to perform data interaction with the mobile device.

In step 406, the mobile device transmits a processing rule corresponding to the computing job from the first interface to the second interface by invoking a write command compliant with the pre-configured interface protocol via the management SDK.

In some embodiments, the processing rule may be a mathematical model for processing the computing jobs. In addition, the computing jobs may be classified into a plurality of categories according to attribute information thereof, such as a graphics processing computing job, a text processing computing job, etc. Different types of computing jobs can be processed according to different types of processing rules. For example, the graphics processing computing job can be processed by preferably using processing rules such as a graphics classifier, a convolutional neural network model, etc., and the text processing computing job can be processed by preferably using processing rules such as a text classifier, a convolutional neural network model, etc. Therefore, in some embodiments, the mobile device can determine, according to a selection operation of the user, a computing job and a processing rule corresponding to the computing job. In addition, the mobile device can also determine the attribute information of the computing job according to the obtained computing job and further automatically match the computing job with a corresponding processing rule based on the attribute information.

After determining a processing rule, the mobile device can transmit the processing rule corresponding to the computing job from the first interface to the second interface by invoking a write command compliant with the pre-configured interface protocol via the management SDK.

In step 407, the acceleration device receives the processing rule at the second interface and writes the processing rule to a pre-configured location of the acceleration device. In this step, the acceleration device receives the processing rule at the second interface and can write the processing rule to the processor of the acceleration device.

In step 408, the mobile device transmits the computing job from the first interface to the second interface by invoking a write command compliant with the pre-configured interface protocol via the management SDK. For details of this step, please refer to the description of step 102, which is not repeated herein.

Optionally, step 408 may specifically include substeps 4081 and 4082. In substep 4081, when the first interface of the mobile device is connected to respective second interfaces of at least two acceleration devices, the mobile device determining a target acceleration device having a load value less than or equal to a pre-configured threshold among the at least two acceleration devices.

Figure 8:
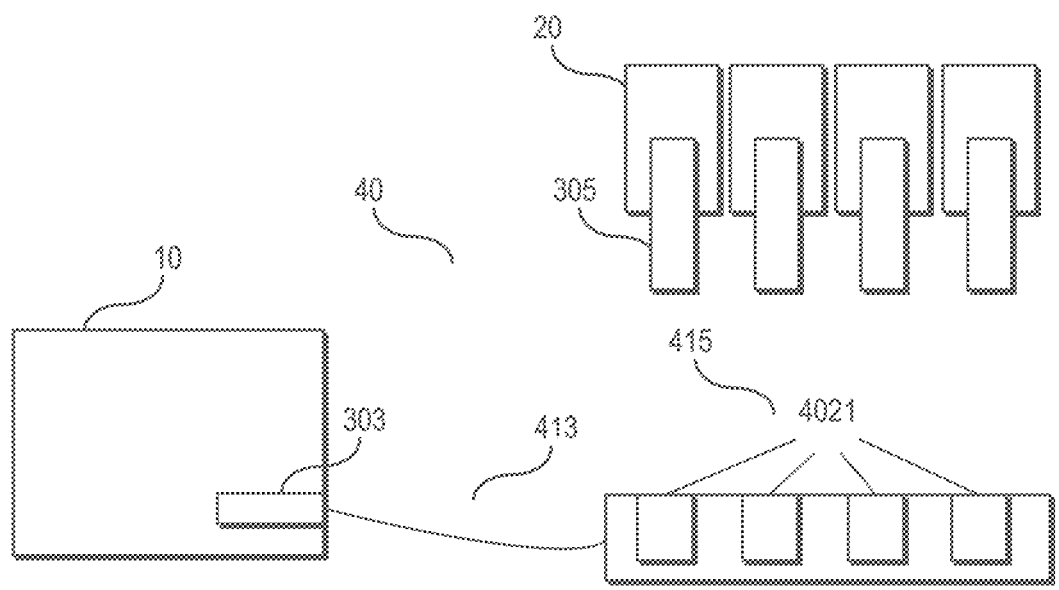
FIG. 8 is a block diagram of another mobile device and another acceleration device according to some embodiments.

Optionally, referring to FIG. 8, a block diagram of another mobile device and another acceleration device according to the application is illustrated. The example embodiments may further include a multiport repeater (e.g., hub 40). Hub 40 includes an input end 413 and an output end 415, including a plurality of output ports 4021.

In the example embodiments, hub 40 is a multiport repeater. That is, hub 40 serves as a docking station of a USB interface, and one or a plurality of acceleration devices 20 can be mounted on each output port 4021 of the output end 415 thereof. In addition, hub 40 receives, via the input end 413 thereof, data transmitted by the mobile device 10 via the first interface 303 and transmits the data to each acceleration device 20 via the output port 4021.

Specifically, based on communication between the mobile device and each acceleration device, the user can view a current load value of each acceleration device from the interface of the mobile device and perform selection operation according to the requirements thereof to select one or a plurality of target acceleration devices having a load value less than or equal to a pre-configured threshold among the plurality of acceleration devices. In addition, the mobile device can also automatically determine, according to the processing capacity of the computing job and the amount of data, the number of target acceleration devices required, and select a target acceleration device having a load value less than or equal to a pre-configured threshold among the plurality of acceleration devices.

In substep 4082, the mobile device transmits the computing job from the first interface to the second interface by invoking a write command compliant with the pre-configured interface protocol via the management SDK.

In this step, supposing that one computing job exists, if computing efficiency on this computing job can be greatly improved, the mobile device can control a plurality of acceleration devices to perform computing processing for this computing job and transmit the computing job and a processing rule corresponding to the computing job to the plurality of target acceleration devices for processing via the management SDK and respectively via the first interface, the second interface, and the hub, thereby achieving an acceleration effect that is multiple times the acceleration effect produced by one acceleration device.

In step 409, the acceleration device receives the computing job at the second interface. For details of this step, please refer to the description of step 103, which is not repeated herein.

In step 410, the acceleration device processes the computing job and transmits a processing result from the second interface to the first interface. For details of this step, please refer to the description of step 104, which is not repeated herein.

Optionally, step 410 may specifically include substeps 4101 and 4102. In subset 4101, when at least two target acceleration devices are included, the at least two target acceleration devices receive a sharing command transmitted by the mobile device.

When the target acceleration device completes the writing of the processing rule to the processor, the target acceleration device transmits to the mobile device a notification indicating that model writing is successful. After receiving respective notifications indicating that model writing is successfully transmitted by all of the target acceleration devices, the mobile device can transmit a sharing command to all of the target acceleration devices, wherein the sharing command may include a PCI identifier of each target acceleration device.

In substep 4102, at least two target acceleration devices share computing resources of the at least two target acceleration devices according to the sharing command and process the computing job to obtain a corresponding computing result.

In this step, each target acceleration device can obtain resource addresses of other target acceleration devices according to the PCI identifiers of other target acceleration devices included in the sharing command to share the computing resources of all of the target acceleration devices so that on each target acceleration device, respective software and hardware resources of all of the target acceleration devices can be scheduled by means of overall planning to process a computing job, thereby greatly improving the efficiency of computing processing.

Specifically, the resource address of the acceleration device may include a software resource address and a hardware resource address. The software resource addresses may include a variable, a table, a queue, etc. The hardware resource address may include a memory address. For example, a memory of one or a plurality of target acceleration devices can be specified as a shared storage region, and all of the target acceleration devices are notified of the memory address of the one or a plurality of target acceleration devices so that all of the target acceleration devices can communicate with each other by reading and writing data in the shared storage region. Shared memory allows process communication to be conveniently performed at the fastest speed, and system invocation is needed only during the establishment of a shared memory region. After that, all the shared memory accesses are processed as conventional memory accesses.

For a computing job, based on scheduling performed by means of overall planning, all of the target acceleration devices can read processing progress and data to be processed of the computing job from the shared storage region, and write processed data into the shared storage region until a computing result is obtained, the processed data is obtained by processing the computing job by means of processors of the target acceleration devices.

The mobile device can also respectively transmit a plurality of computing jobs to a plurality of acceleration devices for processing. When processing performed by an acceleration device on a computing job is completed, the process of this acceleration device can sleep. When another computing job is received, the process of this acceleration device can be resumed to process the computing job.

In step 411, the mobile device obtains the processing result from the first interface by invoking a read command compliant with the pre-configured interface protocol via the management SDK. For details of this step, please refer to the description of step 105, which is not repeated herein.

Optionally, before step 406, the method may further include steps B1 and B2. In step B1, the method can comprise providing, by the mobile device, an input interface for the processing rule. In step B2, the method can comprise receiving, by the mobile device, the processing rule at the input interface.

Specifically, various commonly used processing rules such as image classification, detection, etc., can be stored in the management SDK of the mobile device, and the user can perform selection according to requirements. When these existing processing rules cannot meet the requirements, the user can use the input interface for the processing rule provided by the mobile device to add and use an extended processing rule.

In summary, a method for processing computing jobs provided by the application includes: obtaining, by a mobile device, a computing job, wherein a first interface of the mobile device is connected to a second interface, the second interface included in an acceleration device. In an embodiment, the first interface and the second interface communicate using a pre-configured interface protocol. The method can comprise transmitting, by the mobile device, the computing job from the first interface to the second interface by invoking a write command compliant with the pre-configured interface protocol via a management SDK. The method can then comprise receiving, by the acceleration device, the computing job at the second interface. The method can then comprise processing, by the acceleration device, the computing job and transmitting a processing result from the second interface to the first interface. The method can then comprise obtaining, by the mobile device, the processing result from the first interface by invoking a read command compliant with the pre-configured interface protocol via the management SDK. The mobile device transmits the computing job to the acceleration device. The mobile device transmits the computing job to the acceleration device, and the acceleration device independently performs computing processing on the computing job so that the mobile device does not participate in computing processing the computing job, thereby reducing the dependency of processing the computing job on software and hardware resources of the mobile device and reducing the probability of freezing occurring in the OS of the mobile device. In addition, a physical first interface and a physical second interface are adopted for data transmission between the mobile device and the acceleration device, and the transmission process is real-time and fast, thereby resolving the issue in which processing the computing job depends on the quality of network transmission. Finally, based on architectural characteristics of the mobile OS, the application adopts a read/write command library compliant with the current pre-configured interface protocol; the write command comprised in the read/write command library is used to trigger an operation in which the mobile device invokes a write interface of the OS to transmit data to the acceleration device, and the read command comprised in the read/write command library is used to trigger an operation in which the mobile device invokes a read interface of the OS to receive a computing result transmitted by the acceleration device. Hence, the objective of applying an acceleration device to a mobile device adopting a mobile OS is achieved.

It should be noted that with regard to the method embodiments, all of them are expressed as a combination of a series of actions for simplicity of description; but those skilled in the art will recognize that the example embodiments are not limited by the described order of actions as some steps may, in accordance with the example embodiments, be carried out in other orders or simultaneously. Secondly, those skilled in the art should also appreciate that the embodiments described in the specification all belong to the preferred embodiments and that the involved actions are not necessarily required by the example embodiments.

Based on the above-mentioned embodiments, this embodiment further provides a system for processing computing jobs, a mobile device, and an acceleration device.

Figure 9:
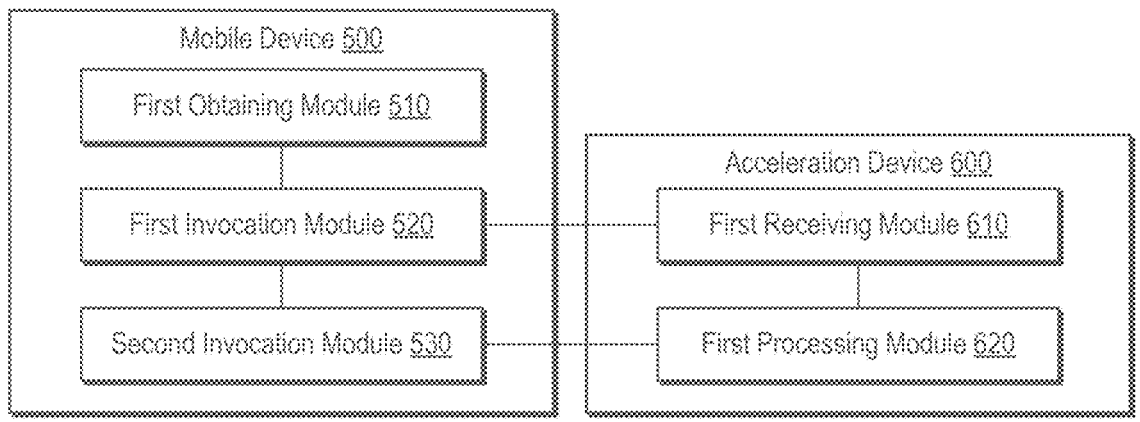
FIG. 9 is a block diagram of an apparatus for processing computing jobs according to some embodiments.

FIG. 9 is a block diagram of a system for processing computing jobs according to the example embodiments.

The system may specifically include the following modules: a mobile device 500 and an acceleration device 600. The first interface of the mobile device is connected to a second interface, the second interface included in an acceleration device. The first interface and the second interface adopt a pre-configured interface protocol.

The mobile device 500 includes a first obtaining module 510 for obtaining a computing job; a first invocation module 520, for transmitting the computing job from the first interface to the second interface by invoking a write command compliant with the pre-configured interface protocol via a management SDK; and a second invocation module 530, for obtaining the processing result from the first interface by invoking a read command compliant with the pre-configured interface protocol via the management SDK.

The acceleration device 600 includes a first receiving module 610, for receiving the computing job at the second interface, and a first processing module 620, for processing the computing job and transmitting a processing result from the second interface to the first interface.

Optionally, the first invocation module 520 includes a load determination sub-module for determining a target acceleration device having a load value less than or equal to a pre-configured threshold among the at least two acceleration devices when the first interface of the mobile device is connected to the respective second interfaces of at least two acceleration devices. The first invocation module 520 further includes a job transmission sub-module for transmitting the computing job from the first interface to the second interface by invoking a write command compliant with the pre-configured interface protocol via the management SDK.

Optionally, the mobile device 500 further includes a sharing command module for allowing at least two target acceleration devices to receive a sharing command transmitted by the mobile device when at least two target acceleration devices are included.

The first processing module 504 includes a sharing and computing sub-module for sharing computing resources of at least two target acceleration devices according to the sharing command and processing the computing job to obtain a corresponding computing result.

Optionally, the mobile device further includes a first granting module for, after the mobile device detects a physical connection between the second interface and the first interface, performing a first granting operation for allowing the acceleration device to perform data interaction with the mobile device.

Optionally, the mobile device 500 further includes a firmware transmission module for allowing the mobile device to transmit acceleration device firmware to the acceleration device via the management SDK.

Optionally, the firmware transmission module includes a selection sub-module for allowing the mobile device to transmit, according to attribute information of the computing job, acceleration device firmware compliant with the attribute information to the acceleration device via the management SDK.

The acceleration device 600 further includes a firmware installation module for installing the acceleration device firmware on the acceleration device, the acceleration device firmware being used to provide an OS supporting processing the computing job.

The mobile device 500 further includes a second granting module for performing a second granting operation for allowing the acceleration device to perform data interaction with the mobile device when the acceleration device firmware is installed on the acceleration device, and restart of the acceleration device is completed.

Optionally, the first granting module or the second granting module includes a monitoring sub-module for invoking a device monitoring interface of the OS of the mobile device via the management SDK. The first granting module or the second granting module can include an authority configuration sub-module forgranting the acceleration device an authority for allowing the acceleration device to perform data interaction with the mobile device when a peripheral component interconnect standard identifier of the acceleration device is obtained via the device monitoring interface.

Optionally, the mobile device 500 further includes a rule transmission module for transmitting a processing rule corresponding to the computing job from the first interface to the second interface by invoking a write command compliant with the pre-configured interface protocol via the management SDK.

The acceleration device 600 further includes a rule write module for allowing the acceleration device to receive the processing rule at the second interface and write the processing rule to a pre-configured location of the acceleration device.

Optionally, the mobile device 500 further includes a rule interface module for allowing the mobile device to provide an input interface for the processing rule; and a rule receiving module for allowing the mobile device to receive the processing rule at the input interface.

In summary, in a system for processing computing jobs provided by the application, the mobile device transmits the computing job to the acceleration device. The mobile device transmits the computing job to the acceleration device, and the acceleration device independently performs computing processing on the computing job so that the mobile device does not participate in computing processing the computing job, thereby reducing the dependency of processing the computing job on software and hardware resources of the mobile device and reducing the probability of freezing occurring in the OS of the mobile device. In addition, a physical first interface and a physical second interface are adopted for data transmission between the mobile device and the acceleration device, and the transmission process is real-time and fast, thereby resolving the issue in which processing the computing job depends on the quality of network transmission. Finally, based on architectural characteristics of the mobile OS, the application adopts a read/write command library compliant with the current pre-configured interface protocol; the write command comprised in the read/write command library is used to trigger an operation in which the mobile device invokes a write interface of the OS to transmit data to the acceleration device, and the read command comprised in the read/write command library is used to trigger an operation in which the mobile device invokes a read interface of the OS to receive a computing result transmitted by the acceleration device. Hence, the objective of applying an acceleration device to a mobile device adopting a mobile OS is achieved.

Figure 10:
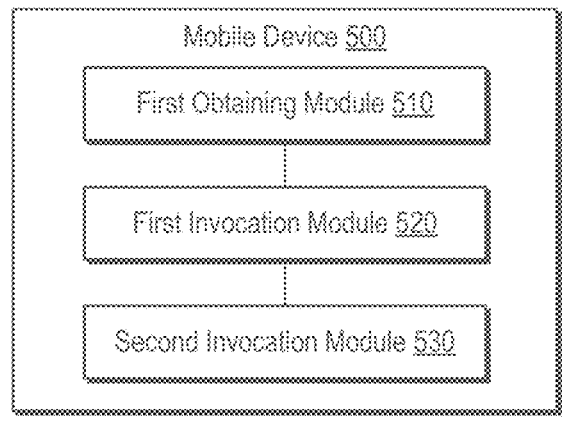
FIG. 10 is a block diagram of a mobile device according to some embodiments.

Referring to FIG. 10, a block diagram of a mobile device according to an embodiment of the application is illustrated. The mobile device may specifically include the following modules a first obtaining module 510, for obtaining a computing job, wherein a first interface of the mobile device is connected to a second interface, the second interface included in an acceleration device. In an embodiment, the first interface and the second interface communicate using a pre-configured interface protocol; a first invocation module 520, for transmitting the computing job from the first interface to the second interface by invoking a write command compliant with the pre-configured interface protocol via a management SDK; and a second invocation module 530, for obtaining the processing result from the first interface by invoking a read command compliant with the pre-configured interface protocol via the management SDK.

It should be noted that reference can be made to the description for FIG. 9 for specific modules on the mobile device side, which is not repeated herein.

In summary, in the example embodiments, the mobile device transmits the computing job to the acceleration device, and the acceleration device independently performs computing processing on the computing job so that the mobile device does not participate in computing processing the computing job, thereby reducing the dependency of processing the computing job on software and hardware resources of the mobile device and reducing the probability of freezing occurring in the OS of the mobile device. In addition, a physical first interface and a physical second interface are adopted for data transmission between the mobile device and the acceleration device, and the transmission process is real-time and fast, thereby resolving the issue in which processing the computing job depends on the quality of network transmission. Finally, based on architectural characteristics of the mobile OS, the application adopts a read/write command library compliant with the current pre-configured interface protocol; the write command comprised in the read/write command library is used to trigger an operation in which the mobile device invokes a write interface of the OS to transmit data to the acceleration device, and the read command comprised in the read/write command library is used to trigger an operation in which the mobile device invokes a read interface of the OS to receive a computing result transmitted by the acceleration device. Hence, the objective of applying an acceleration device to a mobile device adopting a mobile OS is achieved.

Figure 11:
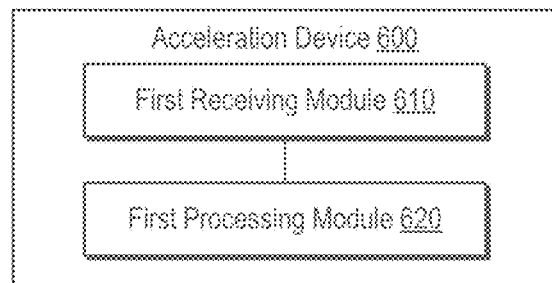
FIG. 11 is a block diagram of an acceleration device according to some embodiments.

Referring to FIG. 11, a block diagram of an acceleration device according to an embodiment of the application is illustrated. The acceleration device may specifically include the following modules a first receiving module 610, for receiving the computing job at the second interface, wherein the second interface of the acceleration device is connected to a first interface of a mobile device; and a first processing module 620, for the acceleration device to process the computing job and transmit a processing result from the second interface to the first interface.

It should be noted that reference can be made to the description for FIG. 9 for specific modules on the acceleration device side, which is not repeated herein.

In summary, in the example embodiments, the mobile device transmits the computing job to the acceleration device, and the acceleration device independently performs computing processing on the computing job so that the mobile device does not participate in computing processing the computing job, thereby reducing the dependency of processing the computing job on software and hardware resources of the mobile device and reducing the probability of freezing occurring in the OS of the mobile device. In addition, a physical first interface and a physical second interface are adopted for data transmission between the mobile device and the acceleration device, and the transmission process is real-time and fast, thereby resolving the issue in which processing the computing job depends on the quality of network transmission. Finally, based on architectural characteristics of the mobile OS, the application adopts a read/write command library compliant with the current pre-configured interface protocol; the write command comprised in the read/write command library is used to trigger an operation in which the mobile device invokes a write interface of the OS to transmit data to the acceleration device, and the read command comprised in the read/write command library is used to trigger an operation in which the mobile device invokes a read interface of the OS to receive a computing result transmitted by the acceleration device. Hence, the objective of applying an acceleration device to a mobile device adopting a mobile OS is achieved.

Figure 12:
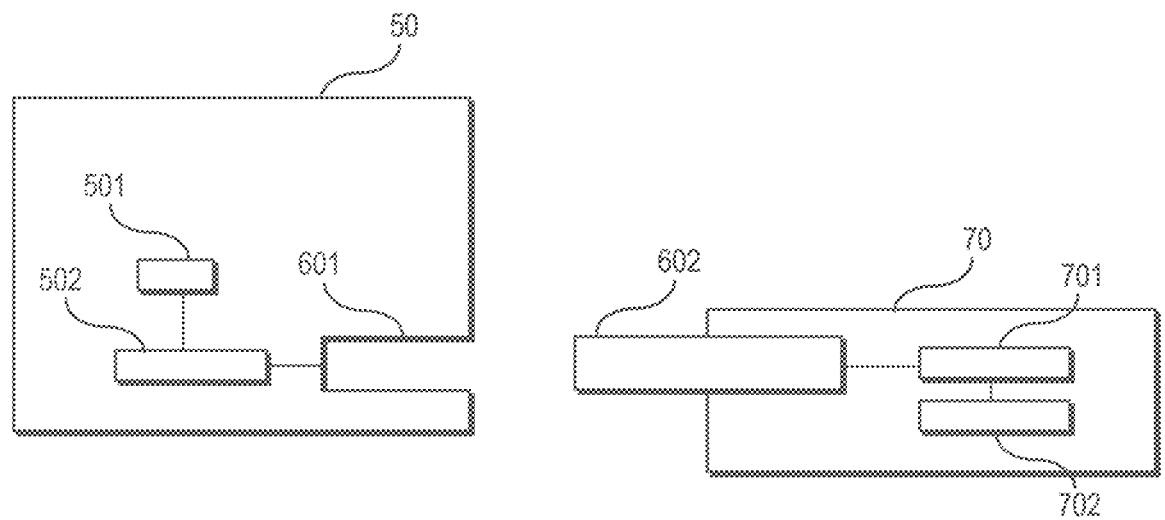
FIG. 12 is a block diagram of a computing system according to some embodiments.

FIG. 12 is a block diagram of a computing system according to some of the example embodiments of the application.

The computing system may specifically include a mobile device 50 and an acceleration device 70 for accelerating a computing job of the mobile device 50. Mobile device 50 includes a first interface 601, and the acceleration device 70 includes a second interface 602. The first interface 601 is connected to the second interface 602. The acceleration device 70 accelerates the computing job of the mobile device 50 via a connection between the first interface 601 and the second interface 602.

Optionally, an Android system or an iOS system is installed on the mobile device.

Specifically, in the example embodiments, mobile OSs such as Android and iOS can be run on the mobile device 50, and various OS interfaces are provided accordingly, so operations such as data reading and writing, device monitoring, and granting can be implemented via these OS interfaces. The mobile device 50 may further be provided with a management SDK, and the management SDK is used to manage the computing jobs and to achieve a communications connection between the mobile device 50 and the acceleration device 70.

Further, the first interface 601 and the second interface 602 have a certain physical structure, and a physical connection between the mobile device 50 and the acceleration device 70 can be achieved. In addition, after a series of device handshake operations, a communications connection between the mobile device 50 and the acceleration device 70 is achieved. In addition, for the first interface 601 provided on the mobile device 50 and the second interface 602 provided on the acceleration device 70 and connected to a second processor 701, since the physical structure of the first interface 601 matches the physical structure of the second interface 602, a physical connection between the mobile device 50 and the acceleration device 70 is achieved.

Further, the acceleration device 70 may be a hardware device independent of the mobile device 50, and the acceleration device 70 may be physically connected to or communicatively connected to the mobile device 50 via the first interface 601 and the second interface 602. The acceleration device 70 may be provided with a second processor 701, and the second processor 701 is used to perform computing processing on the computing job. Specifically, the processor may include one or a plurality of a CPU, a GPU, a digital signal processing (DSP) chip, an application-specific integrated circuit (ASIC), a co-processor chip, and a field-programmable gate array (FPGA) chip. In the example embodiments, the acceleration device 70 is used to offline performing computing processing on the computing job transmitted by the mobile device 50, to achieve the effect of not occupying software and hardware resource of the mobile device, thereby achieving great advantages in processing speed and result response.

In summary, a computing system provided in the application includes a mobile device and an acceleration device for accelerating the computing job of the mobile device. The mobile device includes a first interface, and the acceleration device includes a second interface. The first interface is connected to the second interface. The acceleration device accelerates the computing job of the mobile device via a connection between the first interface and the second interface. In the application, the mobile device can transmit the computing job to the acceleration device via the input/output interface, and the acceleration device independently performs computing processing on the computing job, thereby reducing the dependency of processing the computing job on software and hardware resources of the mobile device and therefore reducing the probability of freezing occurring in the OS of the mobile device. In addition, a physical input/output interface is adopted for data transmission between the mobile device and the acceleration device, and the transmission process is real-time and fast, thereby resolving the issue in which processing the computing job depends on the quality of network transmission.

Figure 13:
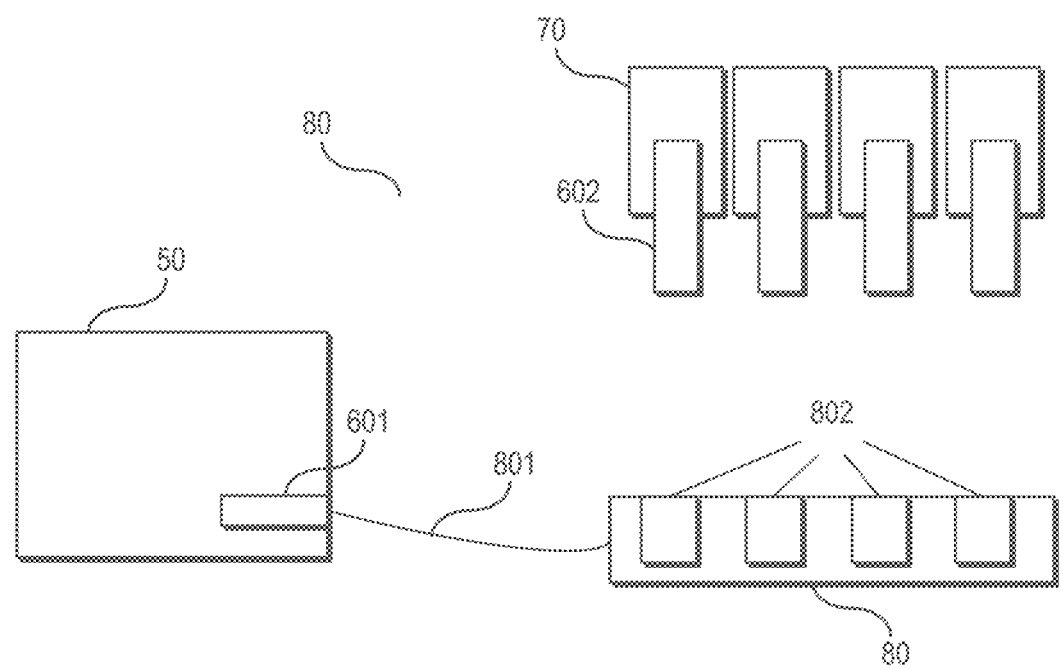
FIG. 13 is a block diagram of another computing system according to some embodiments.

Optionally, referring to FIG. 13, a block diagram of another computing system according to an embodiment of the application is illustrated. The system further includes a USB hub 80. The USB hub 80 includes a third interface 801 and a plurality of fourth interfaces 802. The third interface 801 is connected to the first interface 601. The fourth interface 802 is used to be correspondingly provided with one or a plurality of acceleration devices 70, and the fourth interface 802 is used to be connected to the second interface 602.

In the example embodiments, the USB hub 80 is a multiport repeater. That is, the USB hub 80 serves as a docking station of a USB interface, and one or a plurality of acceleration devices 70 can be mounted on each fourth interface 802 of an output end thereof. In addition, the USB hub 80 receives, via the third interface 801 thereof, data transmitted by the mobile device 50 via the first interface 601, and transmits the data to each acceleration device 70 via the fourth interface 802.

Specifically, based on communication between the mobile device 50, the USB hub 80, and the acceleration devices 70, the user can view a current load value of each acceleration device 70 from the interface of the mobile device 50, and perform selection operation according to the requirements thereof to select one or a plurality of target acceleration devices having a load value less than or equal to a pre-configured threshold among the plurality of acceleration devices 70. In addition, the mobile device 50 can also automatically determine, according to the processing capacity of computing job and the amount of data, the number of target acceleration devices required, and select a target acceleration device having a load value less than or equal to a pre-configured threshold among the plurality of acceleration devices 70.

When one computing job exists, if computing efficiency on this computing job can be greatly improved, the mobile device 50 can control, via the USB hub 80, a plurality of acceleration devices 70 to perform computing processing for this computing job and transmit the computing job and a mathematical model corresponding to the computing job to the plurality of target acceleration devices for processing via the management SDK and respectively via the first interface 601, the second interface 602, and the USB hub 80, thereby achieving an acceleration effect that is multiple times the acceleration effect produced by one acceleration device 70.

Optionally, the first interface and the second interface include at least one of a universal serial bus interface and a lightning interface.

Optionally, the universal serial bus interface includes at least one of a USB Type A interface, a USB Type B interface, and a USB Type C interface.

Specifically, the USB is an external bus standard, and is used to regulate connection and communication between the mobile device and the external device. In addition, the USB interface can implement a "hot plug" function between the mobile device and the acceleration device, thereby facilitating use. In addition, with continuous development of USB technology, the USB interface standards have upgraded from the first generation, namely USB 1.1, to USB 3.1. In addition, depending on the specific structure of the USB interface, different USB interface types such as type-A, type-B, and type-C are also available.

Optionally, referring to FIG. 12, the mobile device 50 further includes a first processor 501 and a first memory 502. The acceleration device 70 includes at least one second processor 701 and a second memory 702.

The first processor 501 is connected to the first interface 601, and the first memory 502 is connected to the first processor 501.

The second processor 701 is connected to the second interface 602, and the second memory 702 is connected to the second processor 701.

The second processor includes an image processor and/or a central processing unit.

Specifically, the first memory 502 can store an obtained computing job and store a mathematical model for processing the computing job. When the mobile device 50 obtains a computing job, the computing job can be stored in a storage partition of the first memory 502 corresponding to the management SDK to facilitate management performed by the management SDK on the computing job.

In the example embodiments, the second memory 702 may be used to store a computing job and a corresponding mathematical model received by the acceleration device 70.

In addition, when a plurality of target acceleration devices provided at the output end of the USB hub 80 exist, the target acceleration device can find resource addresses of other target acceleration devices by obtaining the PCI identifiers of other target acceleration devices to share computing processes of all of the target acceleration devices so that on each target acceleration device, respective software and hardware resources of all of the target acceleration devices can be scheduled by means of overall planning to process a computing job, thereby greatly improving the efficiency of computing processing.

Specifically, the resource address of the acceleration device may include a software resource address and a hardware resource address. The software resource addresses may include a variable, a table, a queue, etc. The hardware resource address may include a memory address. For example, the second memory 702 of one or a plurality of target acceleration devices can be specified as a shared storage region, and all of the target acceleration devices are notified of an address of the second memory 702 of the one or a plurality of target acceleration devices so that all of the target acceleration devices can communicate with each other by reading and writing data in the shared storage region. A shared memory allows process communication to be conveniently performed at a fastest speed, and system invocation is needed only during establishment of a shared memory region. After that, all of shared memory accesses are processed as conventional memory accesses.

For a computing job, based on scheduling performed by means of overall planning, all of the target acceleration devices can read processing progress and data to be processed of the computing job from the shared storage region, and write processed data into the shared storage region until a computing result is obtained, the processed data being obtained by processing the computing job by means of second processors 701 of the target acceleration devices.

In summary, a computing system provided by the application includes a mobile device and an acceleration device for accelerating a computing job of the mobile device. The mobile device includes a first interface, and the acceleration device includes a second interface. The first interface is connected to the second interface. The acceleration device accelerates the computing job of the mobile device via a connection between the first interface and the second interface. In the application, the mobile device can transmit the computing job to the acceleration device via the input/output interface, and the acceleration device independently performs computing processing on the computing job, thereby reducing the dependency of processing the computing job on software and hardware resources of the mobile device and therefore reducing the probability of freezing occurring in the OS of the mobile device. In addition, a physical input/output interface is adopted for data transmission between the mobile device and the acceleration device, and the transmission process is real-time and fast, thereby resolving the issue in which processing the computing job depends on the quality of network transmissions.

The example embodiments further provide a non-volatile readable storage medium. The storage medium stores one or a plurality of modules (e.g., programs). When applied to a device, one or a plurality of modules enable the device to execute commands of various method steps according to the example embodiments.

The example embodiments provide one or a plurality of machine-readable media having commands stored thereon. When executed by one or a plurality of processors, the commands enable an electronic device to perform the method according to one or a plurality of the above embodiments. In the example embodiments, the electronic device includes a server or server cluster, a mobile device, a mobile device, etc.

Figure 14:
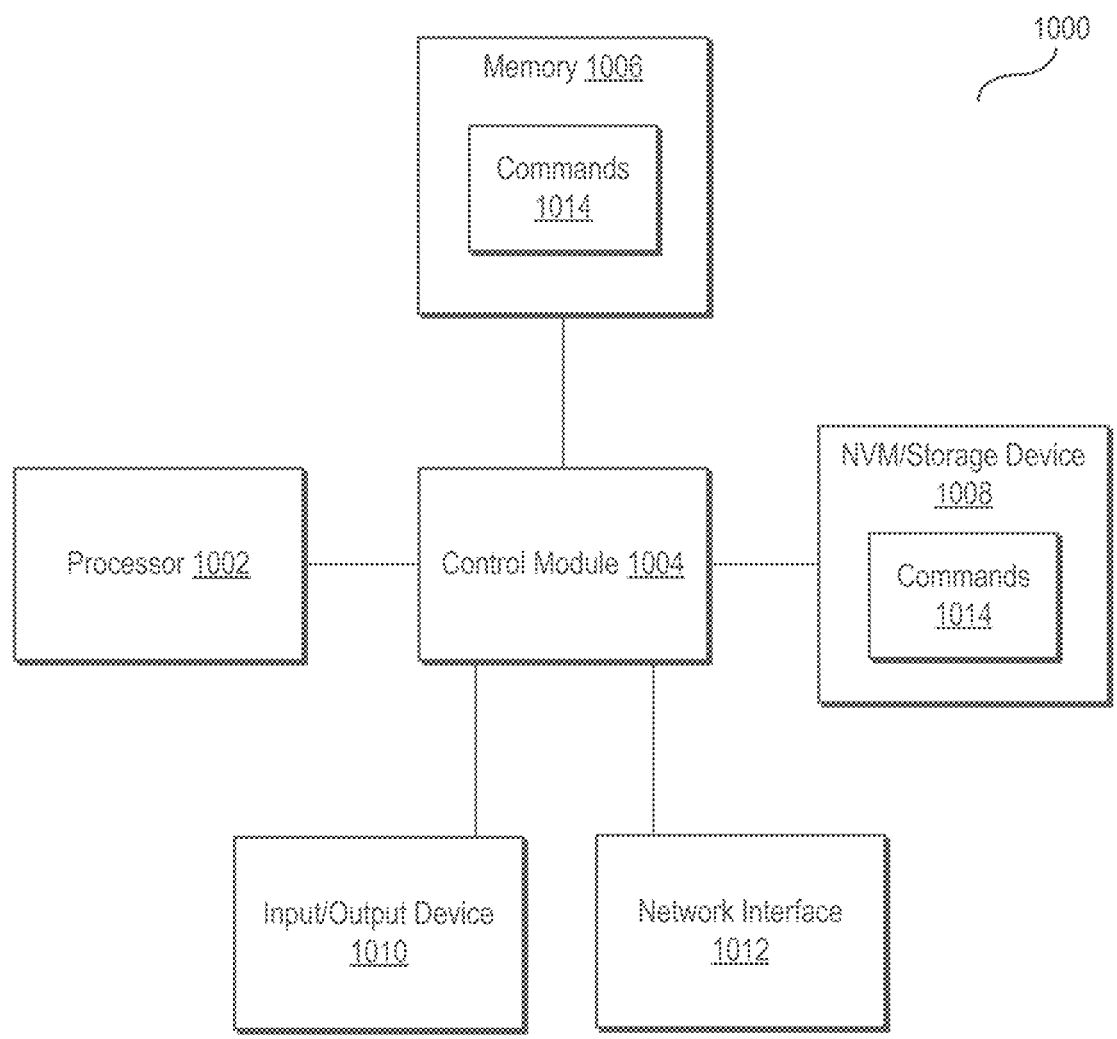
FIG. 14 is a block diagram of an apparatus provided by the application.

The embodiments of the present disclosure can be implemented as an apparatus that uses any suitable hardware, firmware, software, or any combination thereof to perform the desired configuration. The apparatus may include electronic devices such as a server (cluster), a mobile device, a mobile device, etc. FIG. 14 schematically shows an exemplary apparatus 1000 that can be used to implement the example embodiments.

For an embodiment, FIG. 14 shows the exemplary apparatus 1000. The apparatus has one or a plurality of processors 1002, a control module (chipset) 1004 coupled to one or more processors 1002, a memory 1006 coupled to the control module 1004, a non-volatile memory (NVM)/storage device 1008 coupled to the control module 1004, one or a plurality of input/output devices 1010 coupled to the control module 1004, and a network interface 1012 coupled to the control module 1004.

The processors 1002 may include one or a plurality of single-core or multi-core processors. The processors 1002 may include any combination of general-purpose processors or special-purpose processors (for example, graphics processors, application processors, baseband processors, etc.). In some embodiments, the apparatus 1000 can serve as a device such as a server (or server cluster), the mobile device, or the mobile device, according to the example embodiments.

In some embodiments, the apparatus 1000 may include one or a plurality of computer-readable media (for example, the memory 1006 or the NVM/storage device 1008) having commands 1014 and one or a plurality of processors 1002 coupled to the one or a plurality of computer-readable media and configured to execute the commands 1014 to implement modules to perform actions described in the present disclosure.

For an embodiment, the control module 1004 may include any suitable interface controller to provide any suitable interface to one or more processors 1002 and/or to any suitable device or component in communication with the control module 1004.

The control module 1004 may include a memory controller module to provide an interface to the memory 1006. The memory controller module may be a hardware module, a software module, and/or a firmware module.

The memory 1006 may be used to load and store data and/or commands 1014, for example, for the apparatus 1000. For an embodiment, the memory 1006 may include any suitable volatile memory, such as a suitable DRAM. In some embodiments, the memory 1006 may include a double data rate fourth-generation synchronous dynamic random access memory (DDR4 SDRAM).

For an embodiment, the control module 1004 may include one or a plurality of input/output controllers to provide an interface to the NVM/storage device 1008 and the (one or a plurality of) input/output device(s) 1010.

For example, the NVM/storage device 1008 may be used to store data and/or commands 1014. The NVM/storage device 1008 may include any suitable non-volatile memory (for example, a flash memory) and/or may include (one or a plurality of) suitable non-volatile storage device(s) (for example, one or a plurality of hard disk drives (HDDs), one or a plurality of compact disc (CD) drives, and/or one or a plurality of digital versatile disc (DVD) drives).

The NVM/storage device 1008 may include a storage resource that physically forms a part of a device on which the apparatus 1000 is mounted or may be accessible by the device but not necessarily serve as a part of the device. For example, the NVM/storage device 1008 may be accessed over a network via the (one or a plurality of) input/output device(s) 1010.

The (one or a plurality of) input/output device(s) 1010 may provide an interface for the apparatus 1000 to communicate with any other suitable device. The input/output devices 1010 may include a communication component, an audio component, a sensor component, etc. The network interface 1012 may provide an interface for the apparatus 1000 to communicate through one or a plurality of networks. The apparatus 1000 may wirelessly communicate with one or a plurality of components of a wireless network in accordance with any standard and/or protocols of one or a plurality of wireless network standards and/or protocols such as accessing a wireless network based on a communication standard such as WiFi, 2G, 3G, 4G, etc., or a combination thereof to perform wireless communication.

For an embodiment, one or more processors 1002 may be packaged together with the logic of one or a plurality of controllers (for example, the memory controller module) of the control module 1004. For an embodiment, one or more processors 1002 may be packaged together with the logic of one or a plurality of controllers of the control module 1004 to form a system in package (SiP). For an embodiment, one or more processors 1002 may be integrated on the same die with the logic of one or a plurality of controllers of the control module 1004. For an embodiment, one or more processors 1002 may be integrated on the same die with the logic of one or a plurality of controllers of the control module 1004 to form a system on chip (SoC).

In various embodiments, the apparatus 1000 may be, but is not limited to, a mobile device such as a server, a desktop computing device, or a mobile computing device (for example, a laptop computing device, a hand-held computing device, a tablet computer, a netbook, etc.). In various embodiments, the apparatus 1000 may have more or fewer components and/or different architectures. For example, in some embodiments, the apparatus 1000 includes one or a plurality of cameras, a keyboard, a liquid crystal display (LCD) screen (including a touch screen display), a non-volatile memory port, a plurality of antennas, a graphics chip, an application-specific integrated circuit (ASIC), and a speaker.

The example embodiments provide a server, including one or a plurality of processors, and one or a plurality of machine-readable media having commands stored thereon. When executed by one or a plurality of processors, the commands enable the server to perform the data processing method according to one or a plurality of the example embodiments.

The example embodiments provide an electronic device, including one or a plurality of processors and having executable code stored thereon. When executed, the executable code causes the processor to perform the method for processing computing jobs.

The example embodiments provide one or a plurality of machine-readable media, having executable code stored thereon. When executed, the executable code causes a processor to perform the method for processing computing jobs.

With regard to the apparatus embodiments, because the apparatus embodiments are substantially similar to the method embodiments, the description is relatively concise, and reference can be made to the description of the method embodiments for related parts.

Various embodiments in the specification are described in a progressive way, each embodiment focuses on the differences one has from others; and for the same or similar parts between various embodiments, reference may be made to the description of other embodiments.

The example embodiments are described with reference to flow charts and/or block diagrams according to the method, the mobile device (system), and the computer program product according to the example embodiments. It should be understood that each procedure and/or block in the flowcharts and/or block diagrams, and a combination of procedures and/or blocks in the flowcharts and/or block diagrams may be implemented with computer program commands. These computer program commands may be provided to a general-purpose computer, a special-purpose computer, an embedded processor, or a processor of any other programmable data processing mobile device to generate a machineso that the commands executed by a computer or a processor of any other programmable data processing mobile device generate an apparatus for implementing a specified function in one or more processes in the flowcharts and/or in one or more blocks in the block diagrams.

These computer program commands may also be stored in a computer-readable memory that can direct a computer or another programmable data processing mobile device to operate in a particular manner, such that the commands stored in the computer-readable memory produce an article of manufacture including command means, the command means implementing the functions specified in one or more flows of the flowcharts and/or one or more blocks of the block diagrams.

These computer program commands may also be loaded onto a computer or another programmable data processing mobile device such that a series of operational steps are performed on the computer or another programmable mobile device to produce a computer-implemented processing, and thus the commands executed on the computer or another programmable mobile device provide the steps for implementing the functions specified in one or more flows of the flowcharts and/or one or more blocks of the block diagrams.

Preferred embodiments of the example embodiments have been described; however, once knowing basic creative concepts, those skilled in the art can make other variations and modifications on these embodiments. Therefore, the appended claims are intended to be interpreted as including the preferred embodiments and all variations and modifications falling within the scope of the example embodiments.

Finally, it should be further noted that in this text, the relation terms such as first and second are merely used to distinguish one entity or operation from another entity or operation, and do not require or imply that the entities or operations have this actual relation or order. Moreover, the terms "include," "comprise" or other variations thereof are intended to cover non-exclusive inclusionso that a process, a method, an article or a mobile device including a series of elements not only includes the elements, but also includes other elements not clearly listed, or further includes inherent elements of the process, method, article or mobile device. In a case without any more limitations, an element defined by "including a/an . . . " does not exclude that the process, method, article or mobile device including the element further has other identical elements.

A method and an apparatus for processing computing jobs, an electronic device, and a storage medium provided by the application are described in detail above, and the principles and implementations of the application are described by applying specific examples herein. The above descriptions on the embodiments are merely used to help understanding of the method of the application and core ideas thereof. Meanwhile, for those of ordinary skill in the art, modifications may be made on the specific implementations and application scopes according to the idea of the application. In view of the above, the content of the description should not be construed as any limitation to the application.

We claim:

1. A method comprising:
   obtaining, by a mobile device, a computing job, wherein a first interface of the mobile device is physically connected to a second interface of an acceleration device, the first interface and the second interface communicating via a pre-configured interface protocol, the first interface and second interface comprising local interfaces;
   transmitting, by the mobile device, the computing job to the acceleration device using the first interface, an invocation module, and the second interface by invoking a write command compliant with the pre-configured interface protocol, the write command provided via a management software developing kit (SDK) installed on the mobile device; and
   obtaining, by the mobile device, a processing result of the computing job from the acceleration device via the first interface by invoking a read command compliant with the pre-configured interface protocol via the management SDK.

2. The method of claim 1, further comprising:
   detecting, by the mobile device, a physical connection between the second interface and the first interface; and
   performing, by the mobile device, a first granting operation to allow the acceleration device to interact with the mobile device.

3. The method of claim 2, further comprising:
   transmitting, by the mobile device, acceleration device firmware to the acceleration device via the management SDK; and
   performing, by the mobile device, a second granting operation to allow the acceleration device to interact with the mobile device when the acceleration device firmware finishes installing on the acceleration device and a restart of the acceleration device is completed.

4. The method of claim 3, wherein transmitting the acceleration device firmware to the acceleration device comprises:
   transmitting, by the mobile device according to attribute information of the computing job, acceleration device firmware compliant with the attribute information to the acceleration device via the management SDK.

5. The method of claim 2, wherein performing the first granting operation comprises:
   invoking, by the mobile device, a device monitoring interface of an operating system of the mobile device via the management SDK;
   obtaining, by the mobile device, a peripheral component interconnect (PCI) standard identifier of the acceleration device via the device monitoring interface; and
   granting, by the mobile device, the acceleration device an authority to communicate with the mobile device.

6. The method of claim 1, further comprising:
   transmitting, by the mobile device, a processing rule corresponding to the computing job from the first interface to the second interface by invoking a write command compliant with the pre-configured interface protocol via the management SDK.

7. The method of claim 6, further comprising:
   providing, by the mobile device, an input interface for the processing rule; and
   receiving, by the mobile device, the processing rule via the input interface.

8. The method of claim 1, wherein transmitting the computing job from the first interface to the second interface by invoking the write command compliant with the pre-configured interface protocol via the management SDK comprises:
   determining, by the mobile device, a target acceleration device having a load value less than or equal to a pre-configured threshold among at least two acceleration devices; and
   transmitting, by the mobile device, the computing job from the first interface to the second interface by invoking the write command compliant with the pre-configured interface protocol via the management SDK.

9. The method of claim 8, further comprising: when at least two target acceleration devices exist, transmitting, by the mobile device, a sharing command to the at least two target acceleration devices.

10. A device comprising:
    a processor; and
    a storage medium for tangibly storing thereon program logic for execution by the processor, the program logic comprising:
    logic, executed by the processor, for obtaining a computing job, wherein a first interface communicatively coupled to the processor is physically connected to a second interface of an acceleration device, the first interface and the second interface communicating via a pre-configured interface protocol, the first interface and second interface comprising local interfaces;
    logic, executed by the processor, for transmitting the computing job to the acceleration device using the first interface, an invocation module, and the second interface by invoking a write command compliant with the pre-configured interface protocol, the write command provided via a management software developing kit (SDK); and
    logic, executed by the processor, for obtaining a processing result of the computing job from the acceleration device via the first interface by invoking a read command compliant with the pre-configured interface protocol via the management SDK.

11. The device of claim 10, the program logic further comprising:
    logic, executed by the processor, for detecting a physical connection between the second interface and the first interface; and
    logic, executed by the processor, for performing a first granting operation to allow communications with the acceleration device.

12. The device of claim 11, the program logic further comprising:
    logic, executed by the processor, for transmitting acceleration device firmware to the acceleration device via the management SDK; and
    logic, executed by the processor, for performing a second granting operation to allow communications with the acceleration device when the acceleration device firmware finishes installing on the acceleration device and a restart of the acceleration device is completed.

13. The device of claim 12, wherein the program logic transmitting the acceleration device firmware to the acceleration device comprises:
    logic, executed by the processor, for transmitting, according to attribute information of the computing job, acceleration device firmware compliant with the attribute information to the acceleration device via the management SDK.

14. The device of claim 11, wherein performing the program logic for first granting operation comprises:
logic, executed by the processor, for invoking a device monitoring interface of an operating system executed by the processor via the management SDK;
logic, executed by the processor, for obtaining a peripheral component interconnect (PCI) standard identifier of the acceleration device via the device monitoring interface; and
logic, executed by the processor, for allowing communications with the acceleration device.

15. The device of claim 10, the program logic further comprising:
logic, executed by the processor, for transmitting a processing rule corresponding to the computing job from the first interface to the second interface by invoking a write command compliant with the pre-configured interface protocol via the management SDK.

16. A non-transitory computer-readable storage medium for tangibly storing computer program instructions capable of being executed by a computer processor, the computer program instructions defining steps of:
obtaining a computing job, wherein a first interface communicatively coupled to the computer processor is physically connected to a second interface of an acceleration device, the first interface and the second interface communicating via a pre-configured interface protocol, the first interface and second interface comprising local interfaces;
transmitting the computing job to the acceleration device using the first interface, an invocation module, and the second interface by invoking a write command compliant with the pre-configured interface protocol, the write command provided via a management software developing kit (SDK); and
obtaining a processing result of the computing job from the acceleration device via the first interface by invoking a read command compliant with the pre-configured interface protocol via the management SDK.

17. The non-transitory computer-readable storage medium of claim 16, the steps further comprising:
detecting a physical connection between the second interface and the first interface; and
performing a first granting operation to allow communications with the acceleration device.

18. The non-transitory computer-readable storage medium of claim 17, wherein performing the first granting operation comprises:
invoking a device monitoring interface of an operating system via the management SDK;
obtaining a peripheral component interconnect (PCI) standard identifier of the acceleration device via the device monitoring interface; and
granting communications with the acceleration device.

19. The non-transitory computer-readable storage medium of claim 16, the steps further comprising:
transmitting a processing rule corresponding to the computing job from the first interface to the second interface by invoking a write command compliant with the pre-configured interface protocol via the management SDK.

20. The non-transitory computer-readable storage medium of claim 16, wherein transmitting the computing job from the first interface to the second interface by invoking the write command compliant with the pre-configured interface protocol via the management SDK comprises:
determining a target acceleration device having a load value less than or equal to a pre-configured threshold among at least two acceleration devices; and
transmitting the computing job from the first interface to the second interface by invoking the write command compliant with the pre-configured interface protocol via the management SDK.

* * * * *